(12) United States Patent
Cheong et al.

(10) Patent No.: US 11,916,987 B2
(45) Date of Patent: Feb. 27, 2024

(54) ELECTRONIC DEVICE FOR PROCESSING AUDIO DATA, AND OPERATION METHOD THEREOF

(71) Applicant: SAMSUNG ELECTRONICS CO., LTD., Suwon-si (KR)

(72) Inventors: Gupil Cheong, Suwon-si (KR); Doosuk Kang, Suwon-si (KR); Bokun Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/224,420

(22) Filed: Jul. 20, 2023

(65) Prior Publication Data

US 2023/0370511 A1 Nov. 16, 2023

Related U.S. Application Data

(63) Continuation of application No. PCT/KR2021/019843, filed on Dec. 24, 2021.

(30) Foreign Application Priority Data

Jan. 20, 2021 (KR) ........................ 10-2021-0008053

(51) Int. Cl.
*H04L 65/60* (2022.01)
*H04L 67/56* (2022.01)

(52) U.S. Cl.
CPC .............. *H04L 65/60* (2013.01); *H04L 67/56* (2022.05)

(58) Field of Classification Search
CPC .......... H04L 65/60; H04L 67/56; H04W 4/80; H04W 76/15
See application file for complete search history.

(56) References Cited

U.S. PATENT DOCUMENTS 10,348,370 B2   7/2019   Theon et al.
10,485,049 B1   11/2019  Batta et al.
(Continued)

FOREIGN PATENT DOCUMENTS

CN   109347581 A   2/2019
CN   110381485 A   10/2019
(Continued)

OTHER PUBLICATIONS

International Search Report (PCT/ISA/210) issued by the International Searching Authority dated Mar. 24, 2022 in corresponding International Application No. PCT/KR2021/019843.

*Primary Examiner* — Caroline H Jahnige
(74) *Attorney, Agent, or Firm* — Sughrue Mion, PLLC

(57) ABSTRACT

An electronic device includes a communication module; and a processor operatively connected to the communication module, wherein the processor is configured to: establish, a first communication link with a first external electronic device and a second communication link with a second external electronic device; based on a command to output an audio, obtain a first audio packet including first audio data and a second audio packet including second audio data; transmit the first audio packet to the first external electronic device by using the first communication link and transmit the second audio packet to the second external electronic device by using the second communication link; and based on a communication state of the second communication link, request the first external electronic device to perform a link replacement function.

15 Claims, 15 Drawing Sheets

(56) References Cited

U.S. PATENT DOCUMENTS

| | | |
|---|---|---|
| 2006/0274747 A1 | 12/2006 | Duchscher et al. |
| 2016/0316051 A1 | 10/2016 | Hsieh |
| 2017/0111834 A1 | 4/2017 | Belverato |
| 2017/0264987 A1 | 9/2017 | Hong et al. |
| 2017/0366924 A1 | 12/2017 | Thoen |
| 2018/0077493 A1 | 3/2018 | Watson et al. |
| 2019/0044576 A1* | 2/2019 | Thoen .................. H04W 76/14 |
| 2019/0052961 A1* | 2/2019 | Yun ........................ G06F 3/165 |
| 2019/0174232 A1 | 6/2019 | Tong et al. |
| 2019/0327778 A1* | 10/2019 | Morris ................. H04W 88/04 |
| 2020/0107127 A1* | 4/2020 | Gong ..................... H04R 5/033 |
| 2020/0107387 A1* | 4/2020 | Li ....................... H04W 52/383 |
| 2020/0128617 A1 | 4/2020 | Xian et al. |

FOREIGN PATENT DOCUMENTS

| | | |
|---|---|---|
| CN | 110519742 A | 11/2019 |
| CN | 112055280 A | 12/2020 |
| KR | 10-2008-0022180 A | 3/2008 |
| KR | 10-2017-0105795 A | 9/2017 |
| KR | 10-2020-0141496 A | 12/2020 |

\* cited by examiner

ELECTRONIC DEVICE FOR PROCESSING AUDIO DATA, AND OPERATION METHOD THEREOF

CROSS-REFERENCE TO RELATED APPLICATIONS

This application is a by-pass continuation application of International Application No. PCT/KR2021/019843, filed on Dec. 24, 2021, which is based on and claims priority to Korean Patent Application No. 10-2021-0008053, filed on Jan. 20, 2021, in the Korean Intellectual Property Office, the disclosures of which are incorporated by reference herein their entireties.

BACKGROUND

1. Field

One or more embodiments relate to an electronic device processing audio data and a method for operating the same.

2. Detailed Description of Related Art

As wireless communication technology advances, an electronic device may communicate with another electronic device via various wireless communication techniques. Bluetooth communication technology means short-range wireless communication technology that may interconnect electronic devices to exchange data or information. Bluetooth communication technology may have Bluetooth legacy (or classic) network technology or Bluetooth low energy (BLE) network technology and have various kinds of topology, such as piconet or scattemet. Electronic devices may share data at low power using Bluetooth communication technology. Such Bluetooth technology may be used to connect external wireless communication devices and transmit audio data for the content running on the electronic device to an external wireless communication device so that the external wireless communication device may process the audio data and output the result to the user. Bluetooth communication technology-adopted wireless earphones are recently in wide use.

An electronic device using an audio over BLE (AoBLE) topology may establish an independent communication link with external electronic devices and communicate with each of the external electronic devices through the independent communication link. For example, the electronic device may transmit a first mono audio packet to a first external electronic device and transmit a second mono audio packet to a second external electronic device to output stereo audio data through the external electronic devices. In this case, when the communication link connected to either the first external electronic device or the second external electronic device is deteriorated (or communication is deteriorated) due to a physical obstacle or surrounding wireless interference, the corresponding mono audio packet may not be transmitted to the corresponding external electronic device. Since the external electronic device does not receive the mono audio packet, it may output a roaring sound or may output no sound due to an underrun or overflow to the buffer. Further, the electronic device may consume excessive power to retransmit the audio packet to the corresponding external electronic device.

SUMMARY

One or more embodiments may provide an electronic device and a method for operating the same, which requests a link replacement function to allow another external electronic device to listen to a communication link to obtain mono audio data and transmit the obtained mono audio data to an external electronic device upon identifying that the communication link of any one external electronic device is in a communication deteriorated state when forming a communication link to each of two external electronic devices to transmit mono audio data through each communication link.

According to one aspect of the disclosure, an electronic device includes a communication module; and a processor operatively connected to the communication module. The processor is configured to: establish, through the communication module, a first communication link with a first external electronic device and, through the communication module, a second communication link with a second external electronic device; based on a command to output an audio, obtain a first audio packet (including first audio data) and obtain a second audio packet (including second audio data); transmit the first audio packet to the first external electronic device by using the first communication link and transmit the second audio packet to the second external electronic device by using the second communication link; and based on a communication state of the second communication link, request the first external electronic device to: receive the second audio packet by accessing the second communication link, and transmit the second audio packet to the second external electronic device.

According to another aspect of the disclosure, a method is performed by an electronic device including a communication module The method includes: establishing, through the communication module, a first communication link with a first external electronic device and, through the communication module, a second communication link with a second external electronic device; based on a command to output an audio, obtaining a first audio packet comprising first audio data and obtaining a second audio packet comprising second audio data; transmitting the first audio packet to the first external electronic device by using the first communication link and transmitting the second audio packet to the second external electronic device by using the second communication link; and, based on a communication state of the second communication link, requesting the first external electronic device to: receive the second audio packet by accessing the second communication link and transmit the second audio packet to the second external electronic device.

Upon identifying communication deterioration of any one communication link when transmitting audio data through the communication link formed for each of a plurality of external electronic devices, the electronic device may request a link replacement function from any one external device to allow any one external electronic device to transmit audio data to another external electronic device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
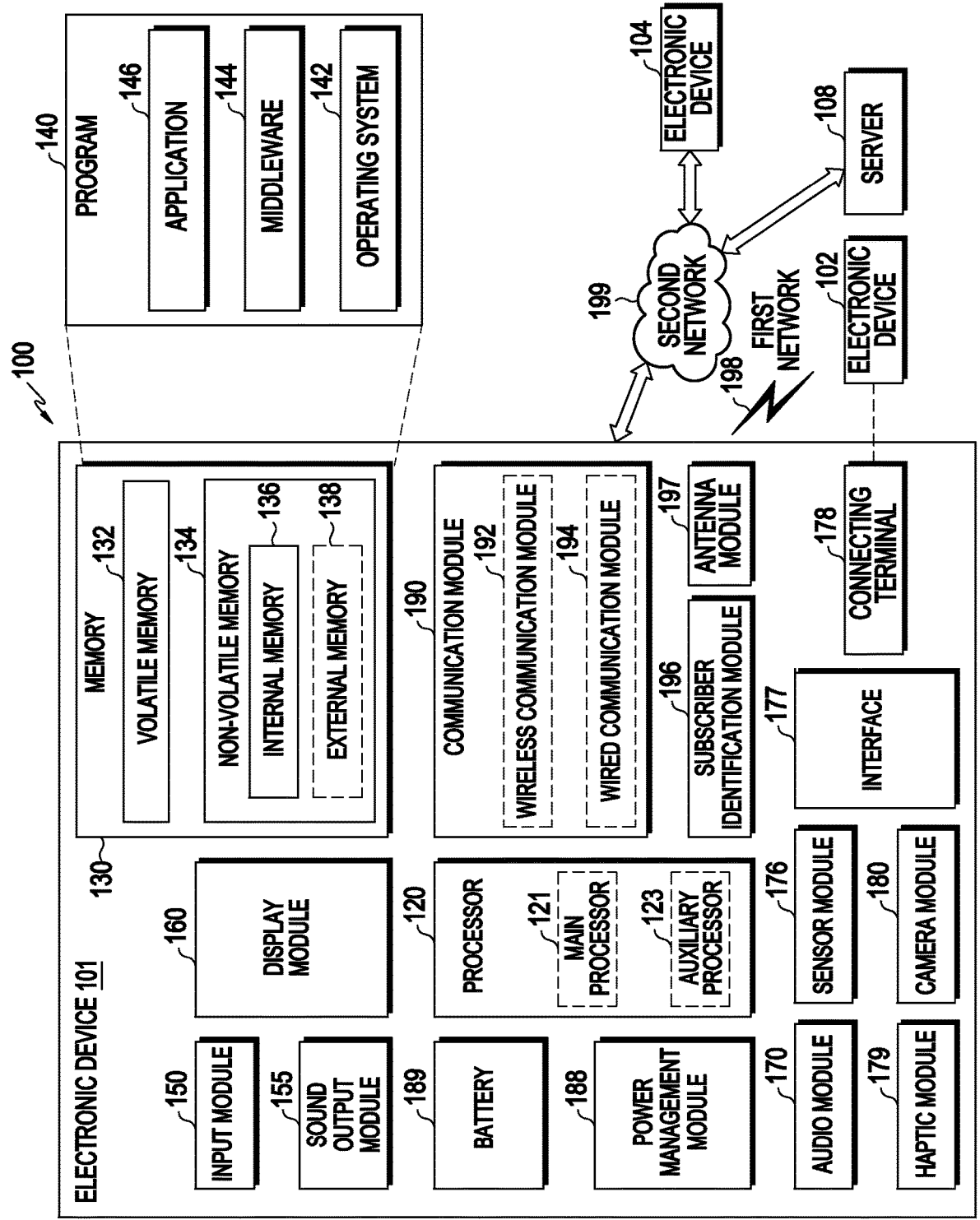
FIG. 1 is a view illustrating an electronic device in a network environment according to one or more embodiments.

FIG. 1 is a block diagram illustrating an electronic device 101 in a network environment 100 according to one or more embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display 160 may include, for example, a display, a hologram device, or a projector and control circuitry to control a corresponding one of the display, hologram device, and projector. According to an embodiment, the display 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductive body or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to one or more embodiments, the antenna module 197 may be a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or health-care) based on 5G communication technology or IoT-related technology.

Figure 2A:
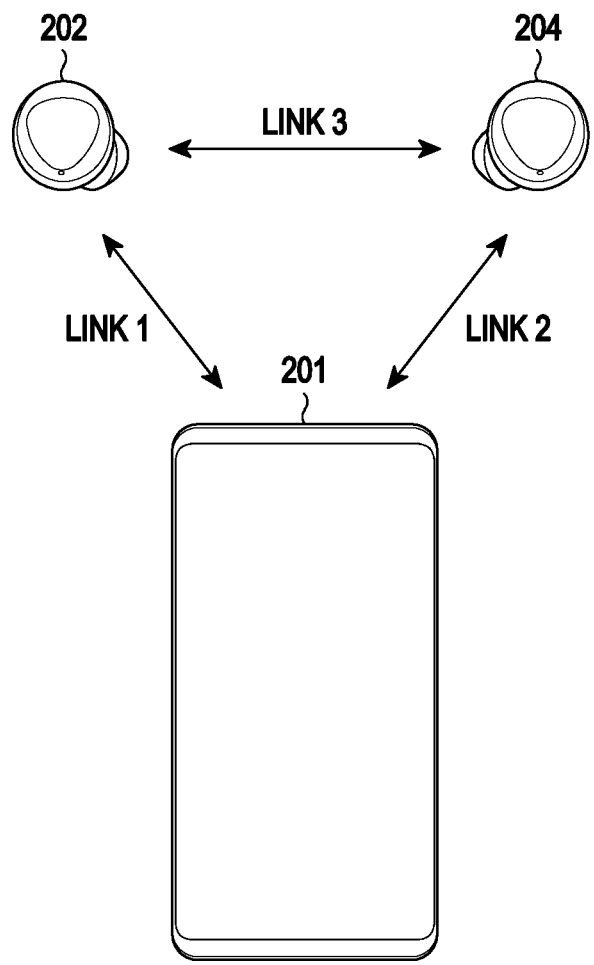
FIGS. 2A and 2B are block diagrams schematically illustrating an electronic system according to one or more embodiments.
Figure 2B:
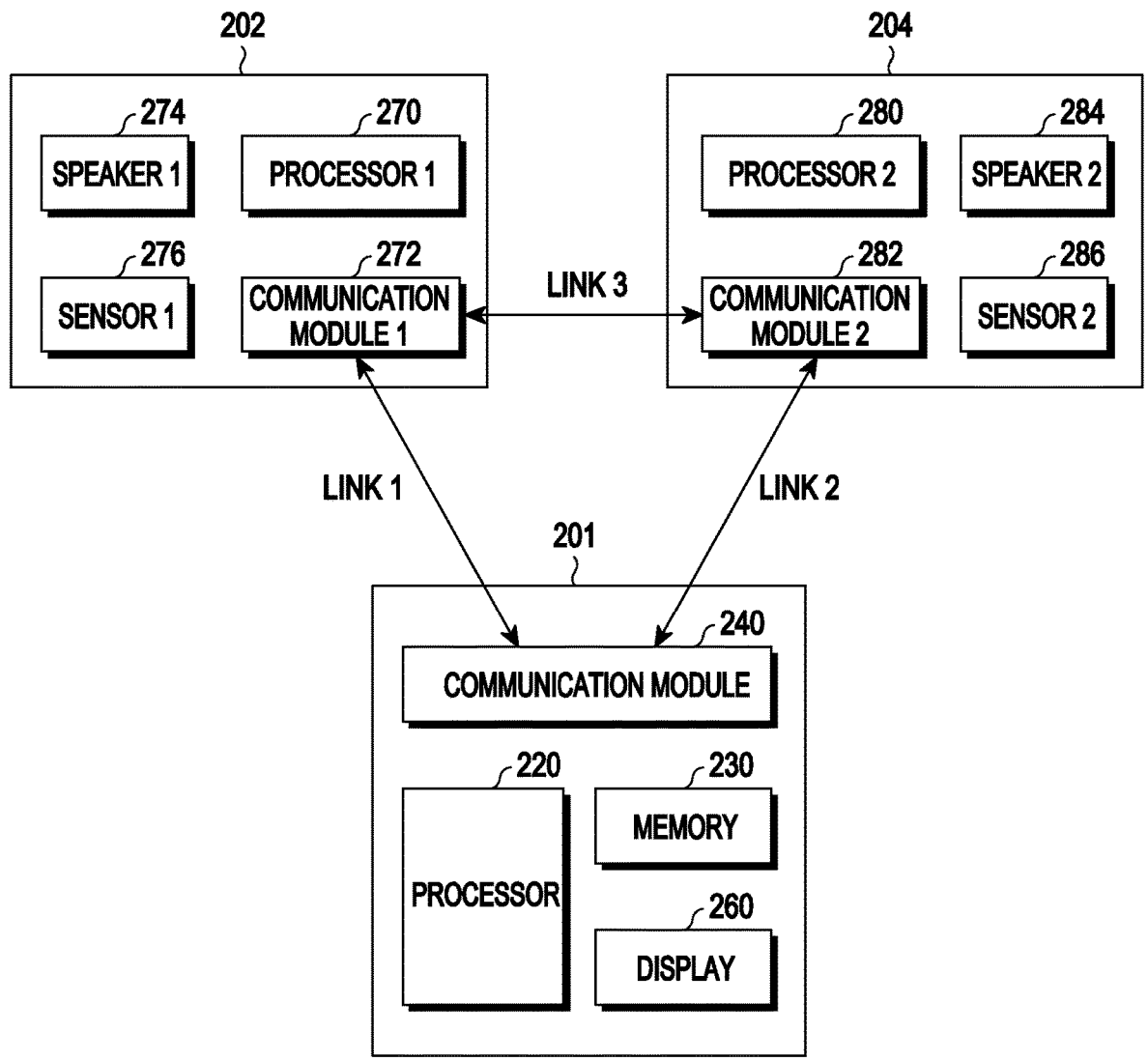

FIGS. 2A and 2B are block diagrams schematically illustrating an electronic system according to one or more embodiments.

Referring to FIG. 2A, an electronic system may include an electronic device 201 and a plurality of external electronic devices (e.g., a first external electronic device 202 and a second external electronic device 204). For example, the electronic device 201, the first external electronic device 202, and the second external electronic device 204 may be implemented to be identical or similar to the electronic device 101 of FIG. 1. For example, the electronic device 201 may be implemented as a smartphone. The first external electronic device 202 and the second external electronic device 204 may be implemented as an earphone in a first direction (e.g., an earphone worn on the right ear) and an earphone in a second direction (e.g., an earphone worn on the left ear). According to an embodiment, the first external electronic device 202 and the second external electronic device 204 may be paired, but may not be limited thereto.

According to one or more embodiments, the electronic device 201 may transmit/receive data to/from the plurality of external electronic devices 202 and 204. To that end, the electronic device 201 may establish a communication link with the plurality of external electronic devices 202 and 204 using a short-range communication scheme (e.g., a Bluetooth communication scheme, a BLE communication scheme, or an AoBLE communication scheme). A method for forming a communication link for transmitting/receiving data to/from a plurality of external electronic devices 202 and 204 by an electronic device 201 is described below with reference to FIG. 2A. However, this is merely an example, and the disclosure is not limited thereto. For example, the electronic device 201 may establish a communication link with the plurality of external electronic devices 202 and 204 using various schemes.

Referring to FIG. 2A, according to one or more embodiments, the electronic device 201 may establish a first communication link LINK1 with the first external electronic device 202 and may establish a second communication link LINK2 with the second external electronic device 204. The electronic device 201 may transmit and receive data to and from the first external electronic device 202 using the first communication link LINK1, and may transmit and receive data to and from the second external electronic device 204 using the second communication link LINK2. According to an embodiment, the electronic device 201 may manage a communication resource to transmit and receive data to and from the first external electronic device 202 or the second external electronic device 204. For example, the electronic device 201 may communicate with the first external electronic device 202 or the second external electronic device 204 by dividing a frequency and/or a time.

According to one or more embodiments, the first external electronic device 202 may establish a third communication link LINK3 with the second external electronic device 204. The first external electronic device 202 may transmit and receive data to and from the second external electronic device 204 using the third communication link LINK3.

According to one or more embodiments, the first communication link LINK1, the second communication link LINK2, and the third communication link LINK3 may be formed as Bluetooth low energy (BLE) communication links. However, the disclosure is not limited thereto, and the first communication link LINK1, the second communication link LINK2, and the third communication link LINK3 may be formed as various communication links.

Referring to FIG. 2B, the electronic device 201 may include a processor 220, a memory 230, a communication module 240, and a display 260.

According to one or more embodiments, the processor 220 may control the overall operation of the electronic device 201. For example, the processor 220 may be implemented as identical or similar to the processor 120 of FIG. 1.

According to one or more embodiments, the processor 220 may obtain audio data to perform audio output. According to an embodiment, the processor 220 may obtain audio data through an external electronic device (e.g., a streaming server). Alternatively, the processor 220 may obtain audio data stored in the memory 230 (e.g., the memory 130 of FIG. 1). For example, the processor 220 may obtain stereo audio data capable of outputting stereo audio.

According to one or more embodiments, the processor 220 may identify a command for outputting stereo audio. For example, the command for outputting stereo audio may include, e.g., a command for reproducing stereo audio, a command for reproducing content (e.g., a video) including stereo audio, a call reception/transmission command, and/or a video call reception/transmission command.

According to one or more embodiments, the processor 220 may obtain (or generate) first audio data corresponding to the first direction and second audio data corresponding to the second direction, based on a command for outputting stereo audio. For example, each of the first audio data and the second audio data may include mono audio data. Further, the processor 220 may obtain a first audio packet including first audio data and a second audio packet including second audio data. For example, the first audio packet may be a packet designated to the first external electronic device 202 (e.g., the right earphone) to output stereo audio, and the second audio packet may be a packet designated to the second external electronic device 204 (e.g., the left earphone) to output stereo audio.

According to an embodiment, the processor 220 may establish a first communication link with the first external electronic device 202 and a second communication link with the second external electronic device 204 via the communication module 240 (e.g., the communication module 190 of FIG. 1). For example, the communication module 240 may support a short-range communication technology (e.g., Bluetooth communication technology).

According to one or more embodiments, the processor 220 may transmit the first audio packet to the first external electronic device 202 using the first communication link and may transmit the second audio packet to the second external electronic device 204 using the second communication link, through the communication module 240. For example, the processor 220 may transmit the first audio packet and the second audio packet to the plurality of external electronic devices 202 and 204, respectively, in a predesignated order in predesignated time intervals, using the first communication link and the second communication link. For example, in the first time interval, the processor 220 may transmit the first audio packet to the first external electronic device 202 for a designated time and may transmit the second audio packet to the second external electronic device 204 for a designated time. Thereafter, in the second time interval after the first time interval, the processor 220 may transmit the first audio packet to the first external electronic device 202 for a designated time and transmit the second audio packet to the second external electronic device 204 for a designated time. For example, in this case, the second time interval may be a time interval different from the first time interval.

According to one or more embodiments, the processor 220 may identify the communication states of the first communication link and the second communication link through the communication module 240. For example, the processor 220 may identify whether the first audio packet and the second audio packet may be smoothly transmitted using the first communication link and the second communication link. For example, for the first communication link and the second communication link, the processor 220 may identify a weak electric field (WEAK CURRENT) situation due to a physical obstacle or a physical distance difference, poor reception quality, wireless signal interference, and/or communication deterioration of the communication link due to an increase in the number of retransmissions. For example, communication deterioration may mean that the communication state of the communication link does not meet a reference value related to at least one of a weak electric field situation, poor reception quality, wireless signal interference, and/or the number of retransmissions. The processor 220 may identify whether the first communication link and/or the second communication link is in a communication deteriorated state.

According to one or more embodiments, when communication deterioration of any one of the first communication link and the second communication link is identified, the processor 220 may request the first external electronic device 202 or the second external electronic device 204 to perform a link replacement function. For example, the link replacement function may refer to the function in which any external electronic device (e.g., the first external electronic device) accesses (e.g., monitors or sniffs the communication link) the communication link (e.g., the second communication link) of another external electronic device (e.g., the second external electronic device) to receive the audio packet (e.g., the second audio packet) to be received by the other external electronic device (e.g., the second external electronic device) and transmits the received audio packet to the other external electronic device (e.g., the second external electronic device).

According to one or more embodiments, after requesting the first external electronic device 202 or the second external electronic device 204 to perform the link replacement function, the processor 220 may transmit the first audio packet to the first external electronic device 202 for a designated first time using the first communication link, and may transmit the second audio packet to the second external electronic device 204 for a designated second time using the second communication link. According to another embodiment, the processor 220 may transmit a message for requesting to perform the link replacement function together with an audio packet (e.g., a first audio packet or a second audio packet) transmitted to the first external electronic device 202 or the second external electronic device 204. For example, when the first external electronic device 202 performs the link replacement function, the first external electronic device 202 may receive the second audio packet transmitted using the second communication link for a designated second time. Alternatively, when the second external electronic device 204 performs the link replacement function, the second external electronic device 204 may receive the first audio packet transmitted using the first communication link for the designated first time.

According to one or more embodiments, when communication deterioration of a specific communication link is identified, the processor 220 may identify a time point at which the link replacement function is requested to be performed. For example, the processor 220 may identify the time point at which the link replacement function is requested based on the reception sensitivity of the packet (e.g., the response packet) received from the first external electronic device 202 or the second external electronic device 204 and/or the average reception sensitivity of the packets in the unit time interval. Alternatively, the processor 220 may identify the time point at which the link replacement function is requested to be performed based on the retransmission time of the audio packet. For example, when the audio packet of the specific sequence number being transmitted is being retransmitted for a predetermined time or more, the processor 220 may transmit a message for requesting to perform the link replacement function. Alternatively, when the audio packet of the specific sequence number being transmitted is being retransmitted for a predetermined number or more, the processor 220 may transmit a message for requesting to perform the link replacement function.

According to one or more embodiments, the processor 220 may request to perform the link replacement function based on whether the first external electronic device 202 and/or the second external electronic device 204 is attached or detached. For example, when a signal indicating detachment of the first external electronic device 202 and/or the second external electronic device 204 is identified, the processor 220 may not request to perform the link replacement function. Alternatively, when a signal indicating attachment of the first external electronic device 202 and the second external electronic device 204 is identified, the processor 220 may request to perform the link replacement function. According to an embodiment, when the first external electronic device 202 and the second external electronic device 204 are attached to the user's body (e.g., ears), the processor 220 may transmit a mono audio packet to each of the external electronic devices 202 and 204. In this case, if any one of the first communication link and the second communication link is identified as communication deterioration, the processor 220 may request to perform the link replacement function through the other communication link. According to another embodiment, when a signal indicating that only one of the first external electronic device 202 and the second external electronic device 204 is attached to the user's body (e.g., ear) is identified, the processor 220 may not request the attached external electronic device to perform the link replacement function. Further, when a signal indicating that any one of the first external electronic device 202 and the second external electronic device 204 is detached from the user's body (e.g., ear) is identified, the processor 220 may not request the detached external electronic device to perform the link replacement function. According to another embodiment, when a signal indicating that both the first external electronic device 202 and the second external electronic device 204 are detached from the user's body is identified, the processor 220 may not transmit an audio packet (e.g., a mono audio packet) to the first external electronic device 202 and the second external electronic device 204.

According to one or more embodiments, the processor 220 may display information about the first communication link and the second communication link through the display 260 (e.g., the display module 160 of FIG. 1). For example, when any one of the first communication link and the second communication link is identified as communication deterioration, the processor 220 may display information about the deterioration of the corresponding communication link on the display 260.

According to one or more embodiments, the processor 220 may obtain information about the wearing states of the plurality of external electronic devices 202 and 204 through the communication module 240. For example, when the wearing state is identified by the sensors 276 and 286 included in the plurality of external electronic devices 202 and 204, respectively, each of the plurality of external electronic devices 202 and 204 may transmit information about the wearing state to the electronic device 201. The processor 220 may identify the wearing state of each of the plurality of external electronic devices 202 and 204 based on the information about the wearing state received from each of the plurality of external electronic devices 202 and 204. Further, the processor 220 may display information about the wearing state through the display 260.

According to one or more embodiments, the first external electronic device 202 may include a first processor 270, a first communication module 272, a first speaker 274, and a first sensor 276.

According to one or more embodiments, the first processor 270 may control the overall operation of the first external electronic device 202. For example, the first processor 270 may be implemented as identical or similar to the processor 120 of FIG. 1.

According to one or more embodiments, the first processor 270 may establish a first communication link with the electronic device 201 and a third communication link with the second external electronic device 204, through the first communication module 272.

According to one or more embodiments, the first processor 270 may receive a first audio packet including first audio data (e.g., mono audio data) from the electronic device 201 using the first communication link. The first processor 270 may perform a first operation for outputting the first audio data through the first speaker 274 based on the first audio packet. For example, the first operation may include the operation of decoding the first audio packet to obtain first audio data and writing the first audio data to a buffer (e.g., a digital signal processing (DSP) buffer). Thereafter, the first processor 270 may output the first audio data through the first speaker 274 based on the sync information included in the first audio packet.

According to one or more embodiments, the first processor 270 may receive a first message for requesting to perform a link replacement function from the electronic device 201 using the first communication link. Alternatively, the first processor 270 may receive the first message together with the first audio packet.

According to one or more embodiments, the first processor 270 may perform a link replacement function in response to receiving the first message. For example, when the first message is received, the first processor 270 may access the second communication link to receive the second audio packet. The first processor 270 may perform a first operation for outputting the first audio data through the first speaker 274 and may transmit a second audio packet including the second audio data to the second external electronic device 204 using the third communication link.

According to one or more embodiments, the first processor 270 may receive a second message for requesting termination of the link replacement function from the electronic device 201 using the first communication link. The first processor 270 may terminate the execution of the link replacement function in response to receiving the second message.

According to one or more embodiments, the first processor 270 may receive the first audio packet from the second external electronic device 204 using the third communication link in the state in which the first audio data (or the first audio packet) is not received from the electronic device 201 using the first communication link (e.g., the communication deteriorated state of the first communication link). Thereafter, the first processor 270 may perform the first operation for outputting the first audio data included in the first audio packet through the first speaker 274 and output the first audio data through the first speaker 274.

According to one or more embodiments, the first processor 270 may obtain information about the wearing state of the first external electronic device 202 through the first sensor 276. Further, the first processor 270 may transmit information about the wearing state of the first external electronic device 202 to the electronic device 201 through the first communication module 272 (e.g., a communication module supporting Bluetooth communication technology). For example, the first sensor 276 may include at least one of a proximity sensor and a pressure sensor.

According to one or more embodiments, when the first communication module 272 may use a plurality of basebands, the first processor 270 may simultaneously perform the functions of the transmitter TX and the receiver RX.

According to one or more embodiments, the second external electronic device 204 may include a second processor 280, a second communication module 282, a second speaker 284, and a second sensor 286.

According to one or more embodiments, the second processor 280 may control the overall operation of the second external electronic device 204. For example, the second processor 280 may be implemented as identical or similar to the processor 120 of FIG. 1.

According to one or more embodiments, the second processor 280 may receive the second audio packet including the second audio data (e.g., mono audio data) from the electronic device 201 using the second communication link. The second processor 280 may perform a second operation for outputting the second audio data through the second speaker 284 based on the second audio packet. For example, the second operation may include the operation of decoding the second audio packet to obtain second audio data and writing the second audio data to a buffer (e.g., a digital signal processing (DSP) buffer). Thereafter, the second processor 280 may output the second audio data through the second speaker 284 based on the sync information included in the second audio packet.

According to one or more embodiments, the second processor 280 may receive a first message for requesting to perform a link replacement function from the electronic device 201 using the second communication link. Alternatively, the second processor 280 may receive the first message together with the second audio packet.

According to one or more embodiments, the second processor 280 may perform the link replacement function in response to receiving the first message. For example, when the first message is received, the second processor 280 may access the first communication link to receive the first audio packet. The second processor 280 may perform the second operation for outputting the second audio data through the second speaker 284, and may transmit the first audio packet including the first audio data to the first external electronic device 202 using the third communication link.

According to one or more embodiments, the second processor 280 may receive a second message for requesting termination of the link replacement function from the electronic device 201 using the second communication link. The second processor 280 may terminate the execution of the link replacement function in response to receiving the second message.

According to one or more embodiments, the second processor 280 may receive the second audio packet from the first external electronic device 202 using the third communication link in the state in which the second audio data (or the second audio packet) is not received from the electronic device 201 using the second communication link (e.g., the communication deteriorated state of the second communication link). Thereafter, the second processor 280 may perform the second operation for outputting the second audio data included in the second audio packet through the second speaker 284 and output the second audio data through the second speaker 284.

According to one or more embodiments, the second processor 280 may obtain information about the wearing state of the second external electronic device 204 through the second sensor 286. Further, the second processor 280 may transmit information about the wearing state of the second external electronic device 204 to the electronic device 201 through the second communication module 282 (e.g., a communication module supporting Bluetooth communication technology). For example, the second sensor 286 may include at least one of a proximity sensor and a pressure sensor.

According to one or more embodiments, when the second communication module 282 may use a plurality of basebands, the second processor 280 may simultaneously perform the functions of the transmitter TX and the receiver RX.

Meanwhile, FIG. 2B illustrates that each of the first external electronic device 202 and the second external electronic device 204 includes one speaker 274 and 284, but this is merely for convenience of description, and the number of speakers may not be limited thereto. For example, each of the first external electronic device 202 and the second external electronic device 204 may include a plurality of speakers. According to an embodiment, each of the first external electronic device 202 and the second external electronic device 204 may output audio data received from the electronic device 201 through a plurality of speakers.

Meanwhile, at least some of the operations performed by the electronic device 201, described below, may be performed by the processor 220. Also, at least some of the operations of the first external electronic device 202 may be performed by the first processor 270, and at least some of the operations of the second external electronic device 204 may be performed by the second processor 280.

For convenience of description, the following description will focus primarily on operations of the electronic device 201, the first external electronic device 202, and the second external electronic device 204 based on the case where the second communication link is communication deteriorated. However, the disclosure is not limited thereto, and may be applied even when the first communication link is communication deteriorated. For example, when the first communication link is communication deteriorated, the electronic device 201 may be configured to transmit (or forward) the first audio packet to (or forward) the first external electronic device 202 to the second external electronic device 204.

Figure 3:
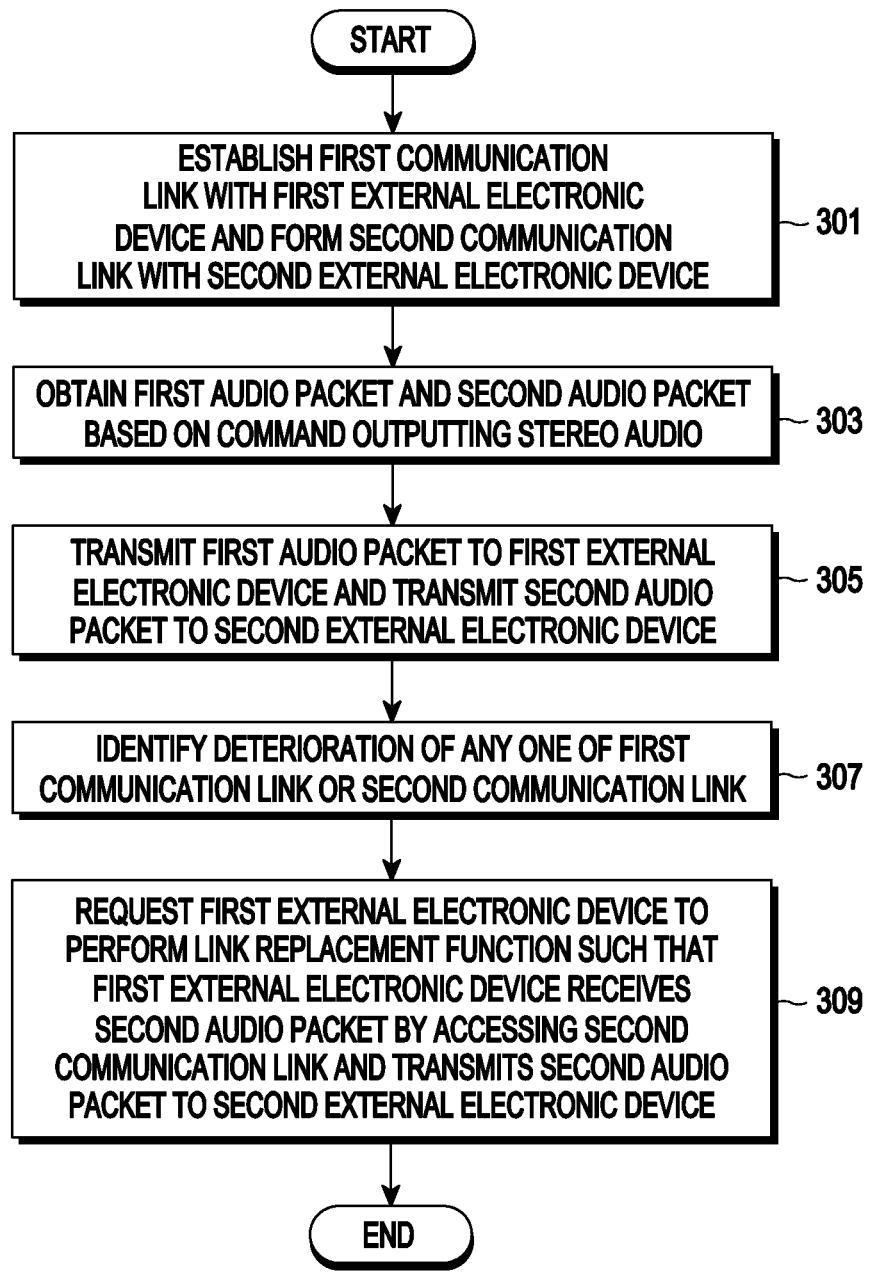
FIG. 3 is a flowchart illustrating a method for operating an electronic device according to one or more embodiments.

FIG. 3 is a flowchart illustrating a method for operating an electronic device according to one or more embodiments.

Referring to FIG. 3, according to one or more embodiments, in operation 301, an electronic device (e.g., the electronic device 201 of FIG. 2) may establish a first communication link with a first external electronic device (e.g., the first external electronic device 202 of FIG. 2) and may establish a second communication link with a second external electronic device (e.g., the second external electronic device 204 of FIG. 2). The electronic device 201 may identify whether the first external electronic device 202 and the second external electronic device 204 are capable of performing a link replacement function. Further, if the first external electronic device 202 and the second external electronic device 204 are capable of performing a link replacement function, the electronic device 201 may share information about the second communication link (e.g., an access code for accessing the second communication link or an access address for accessing the second communication link) with the first external electronic device 202 and may share information about the first communication link (e.g., an access code for accessing the first communication link or an access address for accessing the first communication link) with the second external electronic device 204. For example, the information about the first communication link may include at least one of an access address, a long term key (LTK), information about a connection interval and communication timing, an address of DUT, an event count, a used channel map, or AoBLE setting-related parameters ISO_Interval, Sync_delay, NSE, BN_M_to_S, and BN_S to M.

According to one or more embodiments, in operation 303, the electronic device 201 may obtain a first audio packet and a second audio packet based on a command for outputting stereo audio. For example, the electronic device 201 may obtain the first mono audio data corresponding to the channel in the first direction and the second mono audio data corresponding to the channel in the second direction from the stereo audio data considering the first external electronic device 202 and the second external electronic device 204. Further, the electronic device 201 may generate a first audio packet including first mono audio data and a second audio packet including second mono audio data.

According to one or more embodiments, in operation 305, the electronic device 201 may transmit the first audio packet to the first external electronic device using the first communication link and may transmit the second audio packet to the second external electronic device using the second communication link.

According to one or more embodiments, in operation 307, the electronic device 201 may identify communication deterioration of any one of the first communication link or the second communication link. For example, the electronic device 201 may identify communication deterioration of the communication link considering at least one of whether a reception signal (e.g., a response signal) obtained from the external electronic device 202 or 204 is received, strength, or noise level. For example, when the strength of the received signal is less than the designated value or the noise level of the received signal is higher than the designated level, the electronic device 201 may determine that the corresponding communication link is deteriorated. According to an embodiment, after transmitting a designated number of first audio packets or second audio packets, if a response signal corresponding to the corresponding audio packet is not received, the electronic device 201 may determine that the corresponding communication link is deteriorated. According to another embodiment, after transmitting at least one first audio packet or second audio packet for a designated time, upon failing to receive a response signal corresponding to the corresponding audio packet, the electronic device 201 may determine that the corresponding communication link is deteriorated.

According to one or more embodiments, in operation 309, when it is identified that the second communication link is deteriorated, the electronic device 201 may request the first external electronic device 202 to perform the link replacement function so that the first external electronic device 202 accesses the second communication link, receives the second audio packet, and transmits the second audio packet to the second external electronic device 204. Alternatively, when it is identified that the first communication link is deteriorated, the electronic device 201 may request the second external electronic device 204 to perform the link replacement function so that the second external electronic device 204 accesses the first communication link, receives the first audio packet, and transmits the first audio packet to the first external electronic device 202.

According to one or more embodiments, after requesting to perform the link replacement function, the electronic device 201 may transmit the first audio packet to the first external electronic device 202 using the first communication link and may transmit the second audio packet to the second external electronic device 204 using the second communication link.

According to one or more embodiments, when the communication state of the third communication link between the first external electronic device 202 and the second external electronic device 204 is poor (e.g., when the first external electronic device 202 continuously fails to receive a response signal or continuously receives a non-response signal from the second external electronic device 204), or when the communication state of the first communication link is poor, the electronic device 201 may request the first external electronic device 202 to terminate the execution of the link replacement function.

Figure 4:
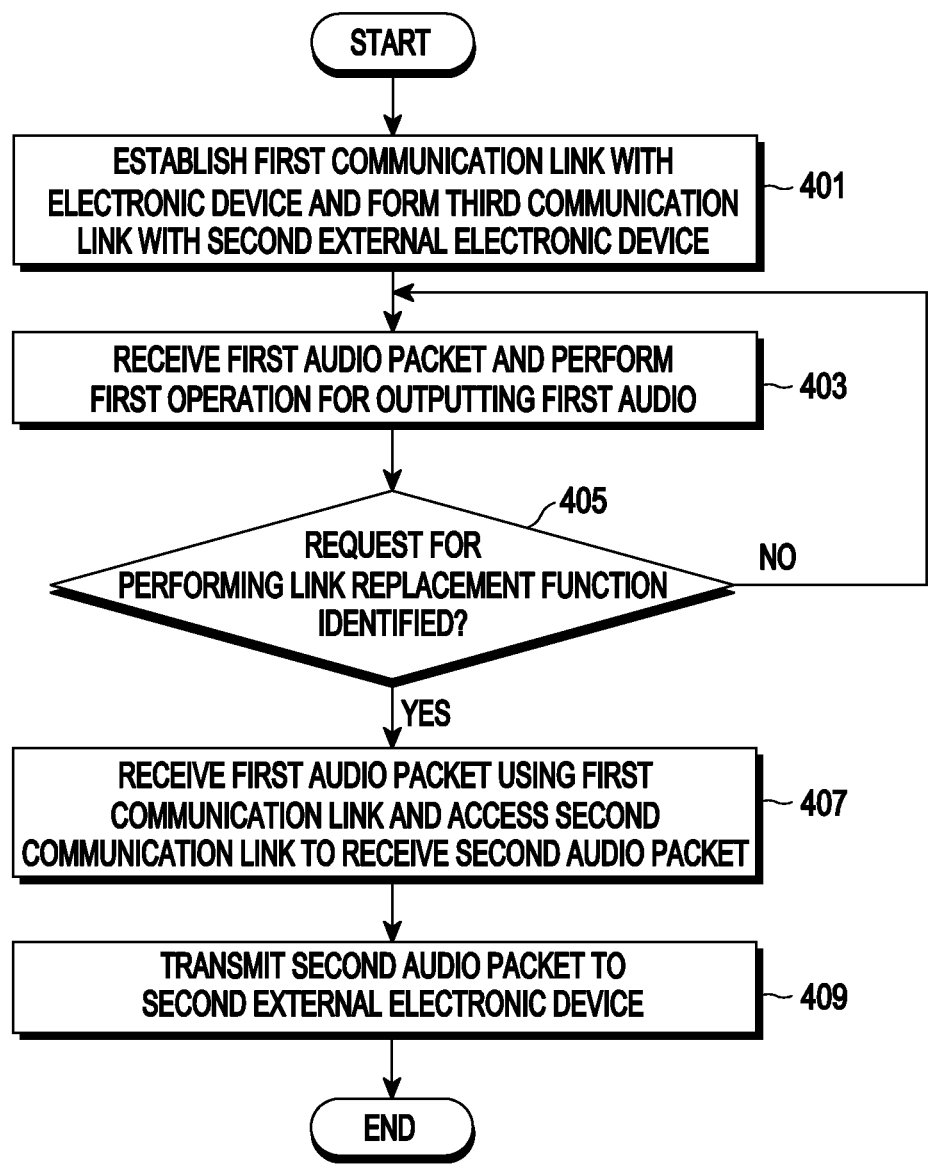
FIG. 4 is a flowchart illustrating a method for transmitting an audio packet to a second external electronic device by a first external electronic device, according to one or more embodiments.

FIG. 4 is a flowchart illustrating a method for transmitting an audio packet to a second external electronic device by a first external electronic device, according to one or more embodiments.

Referring to FIG. 4, according to one or more embodiments, in operation 401, a first external electronic device (e.g., the first external electronic device 202 of FIG. 2) may establish a first communication link with an electronic device (e.g., the electronic device 201 of FIG. 2) and may establish a third communication link with a second external electronic device (e.g., the second external electronic device 204 of FIG. 2). For example, the third communication link may be formed using designated pair information or may be formed through update after being connected to each of the electronic devices (e.g., the electronic device 201 and the second external electronic device 204). For example, the first external electronic device 202 may receive information about the second communication link between the second external electronic device 204 and the electronic device 201 through the first communication link and/or the third communication link. For example, the information about the second communication link may include information about an access code capable of accessing the second communication link.

According to one or more embodiments, in operation 403, the first external electronic device 202 may receive a first audio packet from the electronic device 201 using the first communication link and may perform a first operation for outputting the first audio data included in the first audio packet.

According to one or more embodiments, in operation 405, the first external electronic device 202 may identify whether the link replacement function is requested to be performed using the first communication link. According to another embodiment, the first external electronic device 202 may identify whether the link replacement function is requested from the second external electronic device 204 using the third communication link.

According to one or more embodiments, when it is not requested to perform the link replacement function (No in operation 405), the first external electronic device 202 may receive the first audio packet and may perform the first operation for outputting the first audio data. For example, the first operation may include the operation of decoding the first audio packet to obtain first audio data and writing the first audio data to a buffer (e.g., a digital signal processing (DSP) buffer). Thereafter, the first processor 270 may output the first audio data through the first speaker 274 based on the sync information included in the first audio packet.

According to one or more embodiments, when it is requested to perform the link replacement function (Yes in operation 405), in operation 407, the first external electronic device 202 may receive the first audio packet using the first communication link and may access the second communication link to receive the second audio packet. For example, the first external electronic device 202 may access the second communication link by using the access code of the second communication link. Further, the first external electronic device 202 may access the second communication link to receive a second audio packet that the electronic device 201 intends to transmit to the second external electronic device 204. According to another embodiment, even when it is requested to perform the link replacement function, the first external electronic device 202 may determine whether to perform the link replacement function. For example, when the communication state of the third communication link with the second external electronic device 204 is not good or the communication state of the first communication link with the electronic device 201 is not good, the first external electronic device 202 may not perform the link replacement function.

According to one or more embodiments, in operation 409, the first external electronic device 202 may access the second communication link and transmit the received second audio packet to the second external electronic device using the third communication link.

Figure 5:
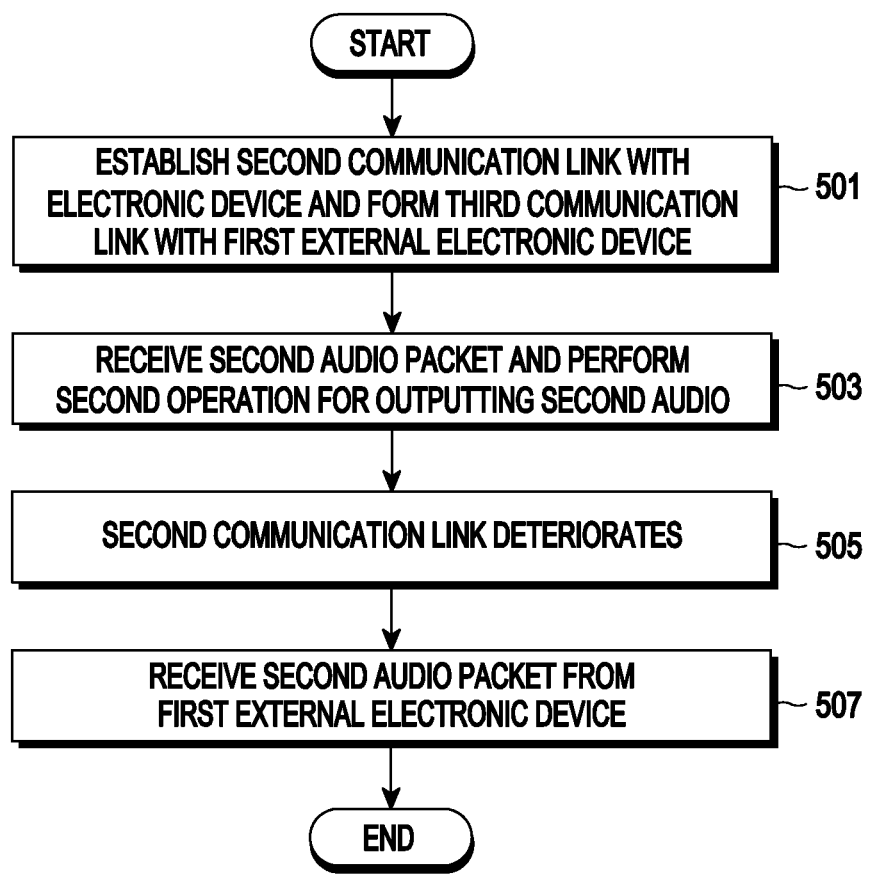
FIG. 5 is a flowchart illustrating a method for receiving an audio packet from a first external electronic device by a second external electronic device according to one or more embodiments.

FIG. 5 is a flowchart illustrating a method for receiving an audio packet from a first external electronic device by a second external electronic device according to one or more embodiments.

Referring to FIG. 5, according to one or more embodiments, in operation 501, a second external electronic device (e.g., the second external electronic device 204 of FIG. 2) may establish a second communication link with an electronic device (e.g., the electronic device 201 of FIG. 2) and may establish a third communication link with a first external electronic device (e.g., the first external electronic device 202 of FIG. 2). For example, the second external electronic device 204 may transmit information about the second communication link to the first external electronic device 202 through the third communication link. For example, the information about the second communication link may include information about an access code capable of accessing the second communication link.

According to one or more embodiments, in operation 503, the second external electronic device 204 may receive the second audio packet from the electronic device 201 using the second communication link and may perform the second operation for outputting the second audio data included in the second audio packet.

According to one or more embodiments, in operation 505, as the second communication link is deteriorated, the second external electronic device 204 may not normally receive the second audio packet from the electronic device 201 using the second communication link. According to an embodiment, when the second audio packet is not normally received using the second communication link, the second external electronic device 204 may transmit a message for requesting to perform the link replacement function to the electronic device 201 and/or the first external electronic device 202.

According to one or more embodiments, in operation 507, the second external electronic device 204 may receive the second audio packet from the first external electronic device 202 using the third communication link. Accordingly, even when the second communication link is deteriorated, the second external electronic device 204 may receive the second audio packet through the first external electronic device 202.

According to an embodiment, upon receiving the second audio packet from the electronic device 201 using the second communication link, the second external electronic device 204 may transmit a message for requesting termination of the link replacement function to the electronic device 201 and/or the first external electronic device 202.

Figure 6A:
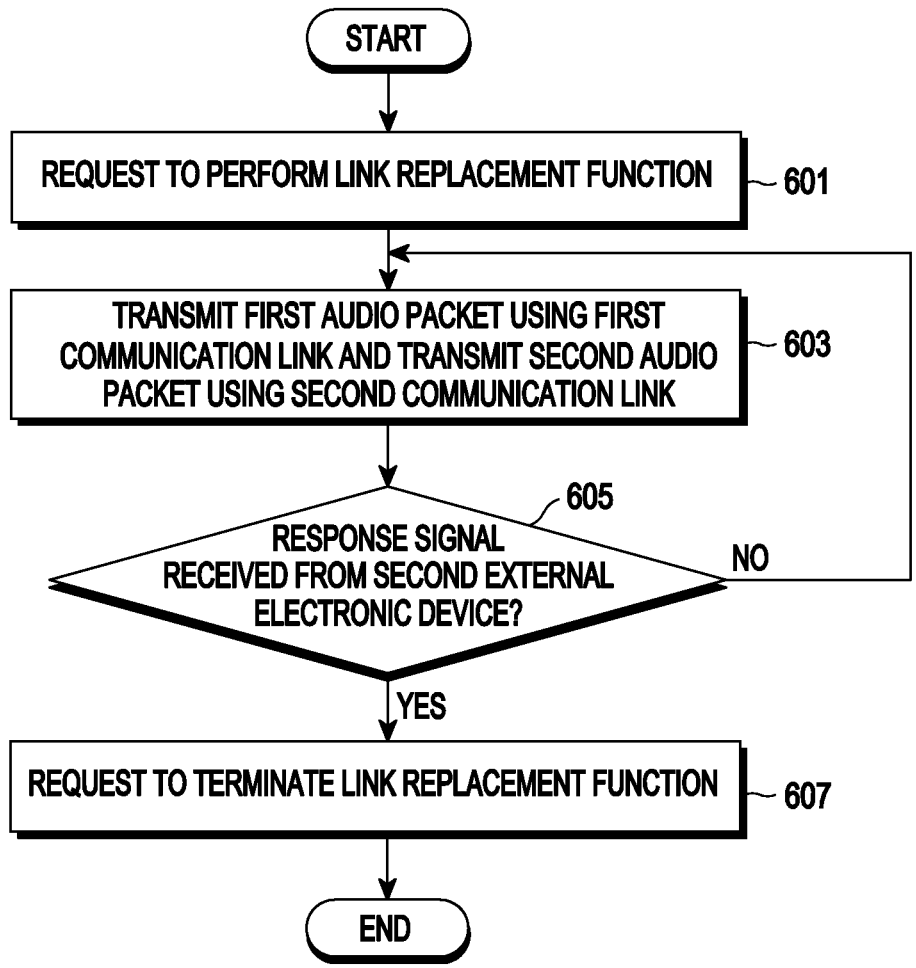
FIGS. 6A and 6B are flowcharts illustrating a method for requesting termination of a link replacement function by an electronic device, according to one or more embodiments.
Figure 6B:
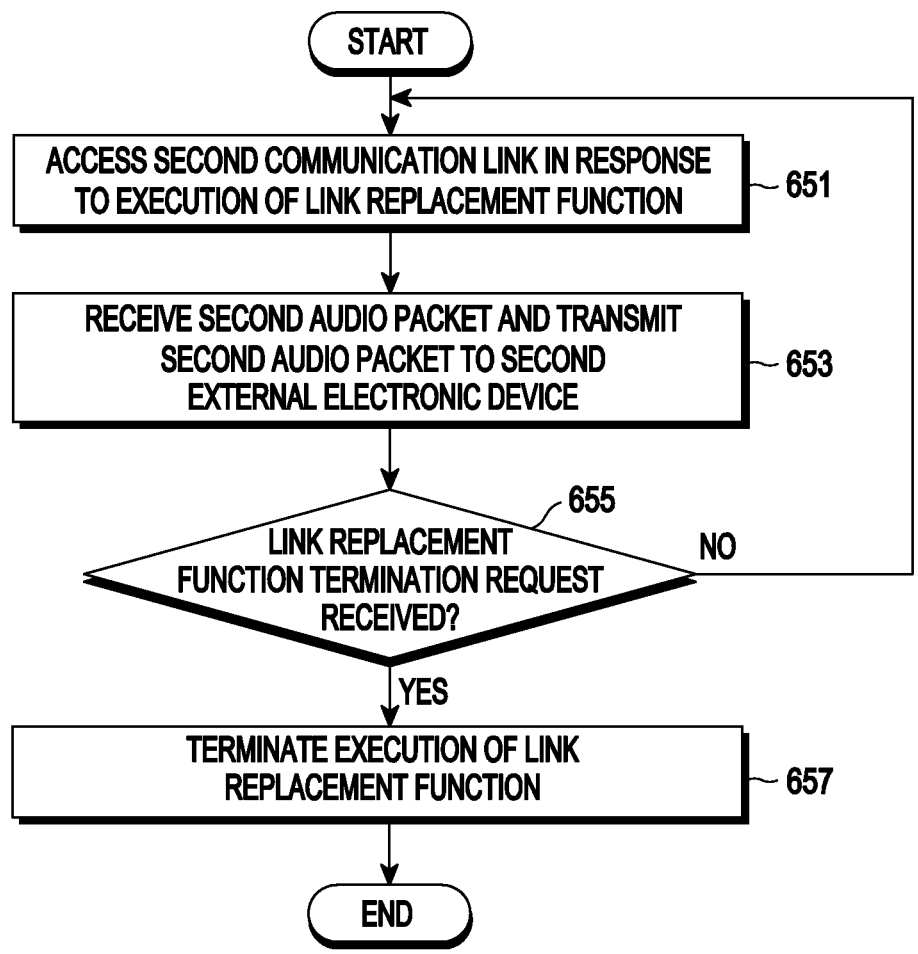

FIGS. 6A and 6B are flowcharts illustrating a method in which an electronic device requests termination of a link replacement function according to one or more embodiments.

Referring to FIG. 6A, according to one or more embodiments, in operation 601, after identifying deterioration of the second communication link, the electronic device (e.g., the electronic device 201 of FIG. 2) may request the first external electronic device (e.g., the first external electronic device 202 of FIG. 2) to perform the link replacement function. For example, when the electronic device 201 transmits the first audio packet to the first external electronic device 202 through the first communication link and identifies deterioration of the second communication link while transmitting the second audio packet to the second external electronic device 204 through the second communication link, the electronic device 201 may transmit the first message to the first external electronic device 202 to request the execution of the link replacement function.

According to one or more embodiments, in operation 603, after requesting to perform the link replacement function, the electronic device 201 may transmit the first audio packet to the first external electronic device 202 using the first communication link and may transmit the second audio packet to the second external electronic device (e.g., the second external electronic device 204 of FIG. 2) using the second communication link. For example, the electronic device 201 may retransmit the second audio packet or may retransmit a designated number of second audio packets to the second external electronic device 204 for a designated time to identify the connection state of the second communication link.

According to one or more embodiments, in operation 605, the electronic device 201 may identify whether a response signal corresponding to the second audio packet is received from the second external electronic device 204.

According to one or more embodiments, if the response signal corresponding to the second audio packet is not received from the second external electronic device 204 (No in operation 605), the electronic device 201 may control the first external electronic device 202 to maintain the link replacement function. Alternatively, the electronic device 201 may not transmit a separate message to the first external electronic device 202. According to another embodiment, even when a non-response signal (NACK signal) corresponding to the second audio packet is received from the second external electronic device 204, the electronic device 201 may control the first external electronic device 202 to maintain the link replacement function.

According to one or more embodiments, when the response signal corresponding to the second audio packet is received from the second external electronic device 204 (Yes in operation 605), in operation 607, the electronic device 201 may request the first external electronic device 202 to terminate the link replacement function. For example, the electronic device 210 may transmit a second message for requesting termination of the link replacement function to the first external electronic device 202 through the first communication link.

Referring to FIG. 6B, according to one or more embodiments, in operation 651, the first external electronic device 202 may access the second communication link in response to performing the link replacement function. For example, the first external electronic device 202 may access the second communication link by using the access code of the second communication link.

According to one or more embodiments, in operation 653, the first external electronic device 202 may access the second communication link to receive the second audio packet, and may transmit the second audio packet to the second external electronic device using the third communication link.

According to one or more embodiments, in operation 655, the first external electronic device 202 may identify whether a message for requesting termination of the link replacement function has been received. For example, a message for requesting termination of the link replacement function may be received from the electronic device 201 and/or the second external electronic device 204.

According to one or more embodiments, if the message for requesting termination of the link replacement function is not received (No in operation 655), the first external electronic device 202 may continue to perform the link replacement function.

According to one or more embodiments, in operation 657, when a message for requesting termination of the link replacement function is received (Yes in operation 655), the first external electronic device 202 may terminate the execution of the link replacement function.

Figure 7A:
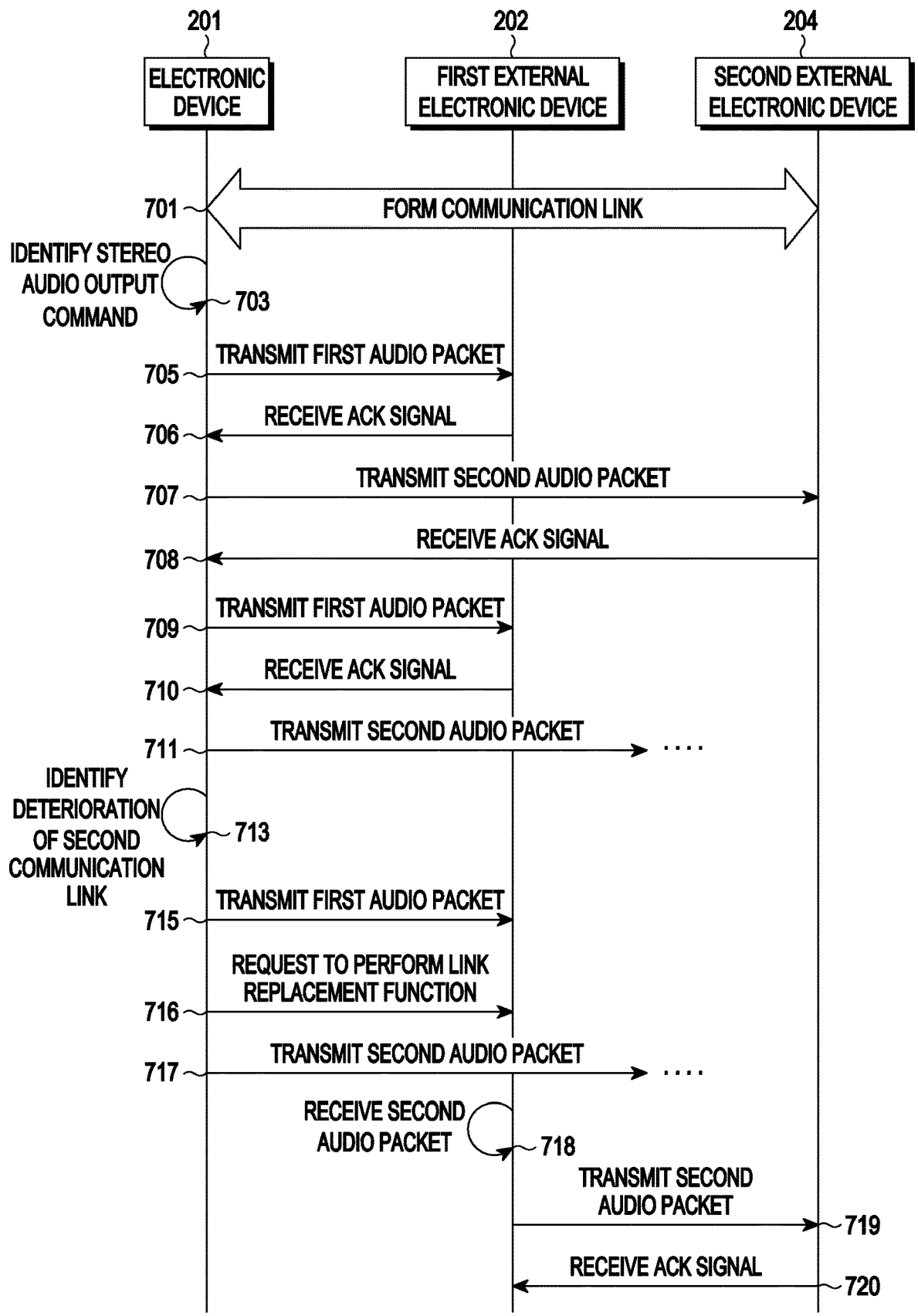
FIGS. 7A and 7B are views illustrating a method for transmitting an audio packet to a plurality of external electronic devices by an electronic device according to one or more embodiments.
Figure 7B:
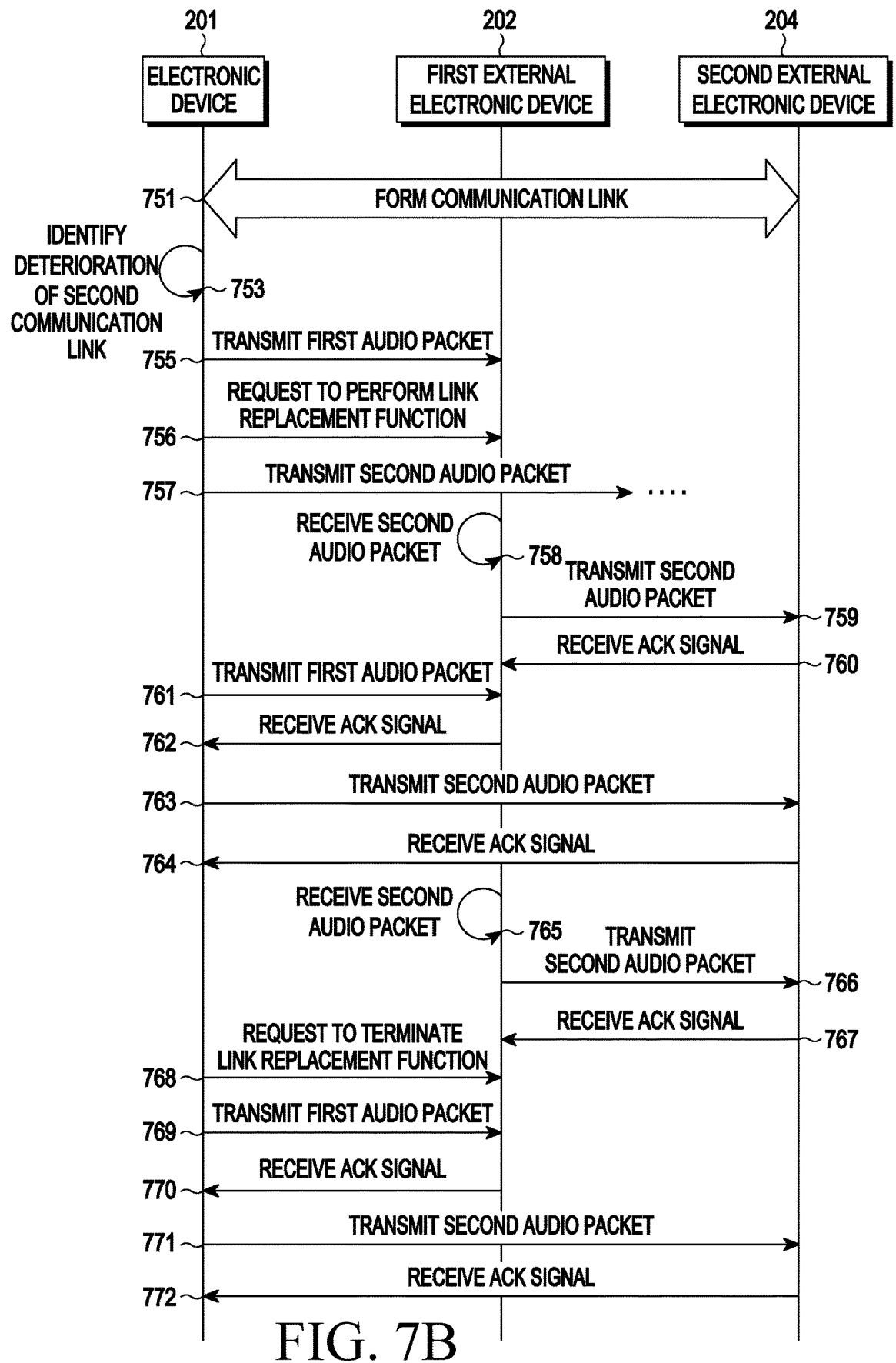

FIGS. 7A and 7B are views illustrating a method for transmitting an audio packet to a plurality of external electronic devices by an electronic device according to one or more embodiments.

Referring to FIG. 7A, according to one or more embodiments, in operation 701, the electronic device 201 may establish a first communication link with the first external electronic device 202 and may establish a second communication link with the second external electronic device 204. Further, the first external electronic device 202 may establish a third communication link with the second external electronic device 204. For example, the first external electronic device 202 may receive information (e.g., an access code) about the second communication link between the second external electronic device 204 and the electronic device 201 through the first communication link and/or the third communication link.

According to one or more embodiments, in operation 703, the electronic device 201 may identify a command for outputting stereo audio. The electronic device 201 may obtain first audio data and second audio data for stereo audio data, based on the command to output audio (e.g., stereo audio). Further, the electronic device 201 may obtain a first audio packet including first audio data and a second audio packet including second audio data.

According to one or more embodiments, in operation 705, the electronic device 201 may transmit the first audio packet of the first time interval to the first external electronic device 202 using the first communication link. In operation 706, the electronic device 201 may receive a response signal ("ACK" signal) corresponding to the first audio packet of the first time interval. In operation 707, the electronic device 201 may transmit the second audio packet of the first time interval to the second external electronic device 204 using the second communication link. In operation 708, the electronic device 201 may receive a response signal (ACK signal) corresponding to the second audio packet of the first time interval.

According to one or more embodiments, in operation 709, the electronic device 201 may transmit the first audio packet of the second time interval to the first external electronic device 202 using the first communication link. In operation 710, the electronic device 201 may receive a response signal (ACK signal) corresponding to the first audio packet of the second time interval. In operation 711, the electronic device 201 may transmit the second audio packet of the second time interval to the second external electronic device 204 using the second communication link. For example, the electronic device 201 may not receive a response signal (ACK signal) corresponding to the second audio packet of the second time interval. For example, the failure to receive the response signal (ACK signal) may include a case in which a non-response signal (NACK signal) is received after transmitting the corresponding packet or a case in which no response signal is received after transmitting the corresponding packet.

According to one or more embodiments, in operation 713, the electronic device 201 may identify that the second communication link is deteriorated, based on failure to receive the response signal (ACK signal) corresponding to the second audio packet of the second time interval. For example, when the electronic device 201 transmits the second audio packet of the second time interval for a designated number of times and fails to receive the response signal (ACK signal) from the second external electronic device 204, or fails to receive the response signal (ACK signal) from the second external electronic device 204 within the designated time, the electronic device 201 may identify that the second communication link is deteriorated.

According to one or more embodiments, in operation 715, the electronic device 201 may transmit the first audio packet of the third time interval to the first external electronic device 202 using the first communication link. In operation 716, the electronic device 201 may transmit a message for requesting to perform the link replacement function to the first external electronic device 202. The first external electronic device 202 may perform the link replacement function in response to a message for requesting to perform the link replacement function. According to an embodiment, the electronic device 201 may request the first external electronic device 202 to perform the link replacement function and may receive a response thereto.

According to one or more embodiments, in operation 717, the electronic device 201 may transmit the second audio packet of the third time interval to the second external electronic device 204 using the second communication link. For example, until a response signal (ACK signal) corresponding to the second audio packet is received, the electronic device 201 may retransmit the second audio packet of the third time interval to the second external electronic device 204 a designated number of times and/or for a designated time using the second communication link. According to another embodiment, if the electronic device 201 may identify that the communication state of the second communication link is normal again using another communication protocol (for example, if the communication state of the second communication link is identified by receiving a packet or message using another communication protocol), the first external electronic device 202 may forward the second audio packet to the second external electronic device 204 and then transmit the response signal (ACK signal) to the electronic device 201 (instead of the second external electronic device 204). In operation 718, the first external electronic device 202 may access the second communication link to receive the second audio packet.

According to one or more embodiments, in operation 719, the first external electronic device 202 may transmit (or forward) the second audio packet of the third time interval to the second external electronic device 204 using the third communication link. In operation 720, the first external electronic device 202 may receive a response signal (ACK signal) corresponding to the second audio packet of the third time interval.

Accordingly, even when the second communication link is deteriorated, the electronic device 201 may transmit the second audio packet to the second external electronic device 204 through the first external electronic device 202.

Referring to FIG. 7B, according to one or more embodiments, in operation 751, the electronic device 201 may establish a first communication link with the first external electronic device 202 and may establish a second communication link with the second external electronic device 204. Further, the first external electronic device 202 may establish a third communication link with the second external electronic device 204. For example, the first external electronic device 202 may receive information (e.g., an access code) about the second communication link between the second external electronic device 204 and the electronic device 201 through the first communication link and/or the third communication link.

According to one or more embodiments, in operation 753, the electronic device 201 may identify that the second communication link is deteriorated.

According to one or more embodiments, in operation 755, the electronic device 201 may transmit the first audio packet of the fourth time interval to the first external electronic device 202 using the first communication link. In operation 756, the electronic device 201 may transmit a message for requesting to perform the link replacement function to the first external electronic device 202. The first external electronic device 202 may perform the link replacement function in response to a message for requesting to perform the link replacement function.

According to one or more embodiments, in operation 757, the electronic device 201 may transmit the second audio packet of the fourth time interval to the second external electronic device using the second communication link. The second external electronic device 204 may not receive the second audio packet using the second communication link due to communication deterioration of the second communication link.

According to one or more embodiments, in operation 758, the first external electronic device 202 may access the second communication link to receive the second audio packet of the fourth time interval. In operation 759, the first external electronic device 202 may transmit the second audio packet of the fourth time interval to the second external electronic device 204 using the third communication link. In operation 760, the first external electronic device 201 may receive a response signal (ACK signal) corresponding to the second audio packet of the fourth time interval.

According to one or more embodiments, in operation 761, the electronic device 201 may transmit the first audio packet of the fifth time interval to the first external electronic device 202 using the first communication link. In operation 762, the electronic device 201 may receive a response signal (ACK signal) corresponding to the first audio packet of the fifth time interval.

According to one or more embodiments, in operation 763, the electronic device 201 may transmit the second audio packet of the fifth time interval to the second external electronic device 204 using the second communication link. In operation 764, the electronic device 201 may receive a response signal (ACK signal) corresponding to the second audio packet of the fifth time interval from the second external electronic device 204. For example, the electronic device 201 may determine that the second communication link is in a normal state, based on the response signal (ACK signal) corresponding to the second audio packet of the fifth time interval being received from the second external electronic device 204.

According to one or more embodiments, in operation 765, the first external electronic device 202 may access the second communication link to receive the second audio packet of the fifth time interval. In operation 766, the first external electronic device 202 may transmit the second audio packet of the fifth time interval to the second external electronic device 204 using the third communication link. In operation 767, the first external electronic device 201 may receive a response signal (ACK signal) corresponding to the second audio packet of the fifth time interval. However, since the second external electronic device 204 has already received the second audio packet of the fifth time interval in operation 763, the second external electronic device 204 may discard or disregard the second audio packet of the fifth time interval received from the first external electronic device 202.

According to one or more embodiments, in operation 768, the electronic device 201 may transmit a message for requesting termination of the link replacement function to the first external electronic device.

According to one or more embodiments, in operation 769, the electronic device 201 may transmit the first audio packet of the sixth time interval to the first external electronic device 202 using the first communication link. In operation 770, the electronic device 201 may receive a response signal (ACK signal) corresponding to the first audio packet of the sixth time interval. In operation 771, the electronic device 201 may transmit the second audio packet of the sixth time interval to the second external electronic device 204 using the second communication link. In operation 772, the electronic device 201 may receive a response signal (ACK signal) corresponding to the second audio packet of the sixth time interval. In other words, since the deterioration of the second communication link is resolved, the first external electronic device 202 may access the second communication link and may not receive the second audio packet.

Figure 8:
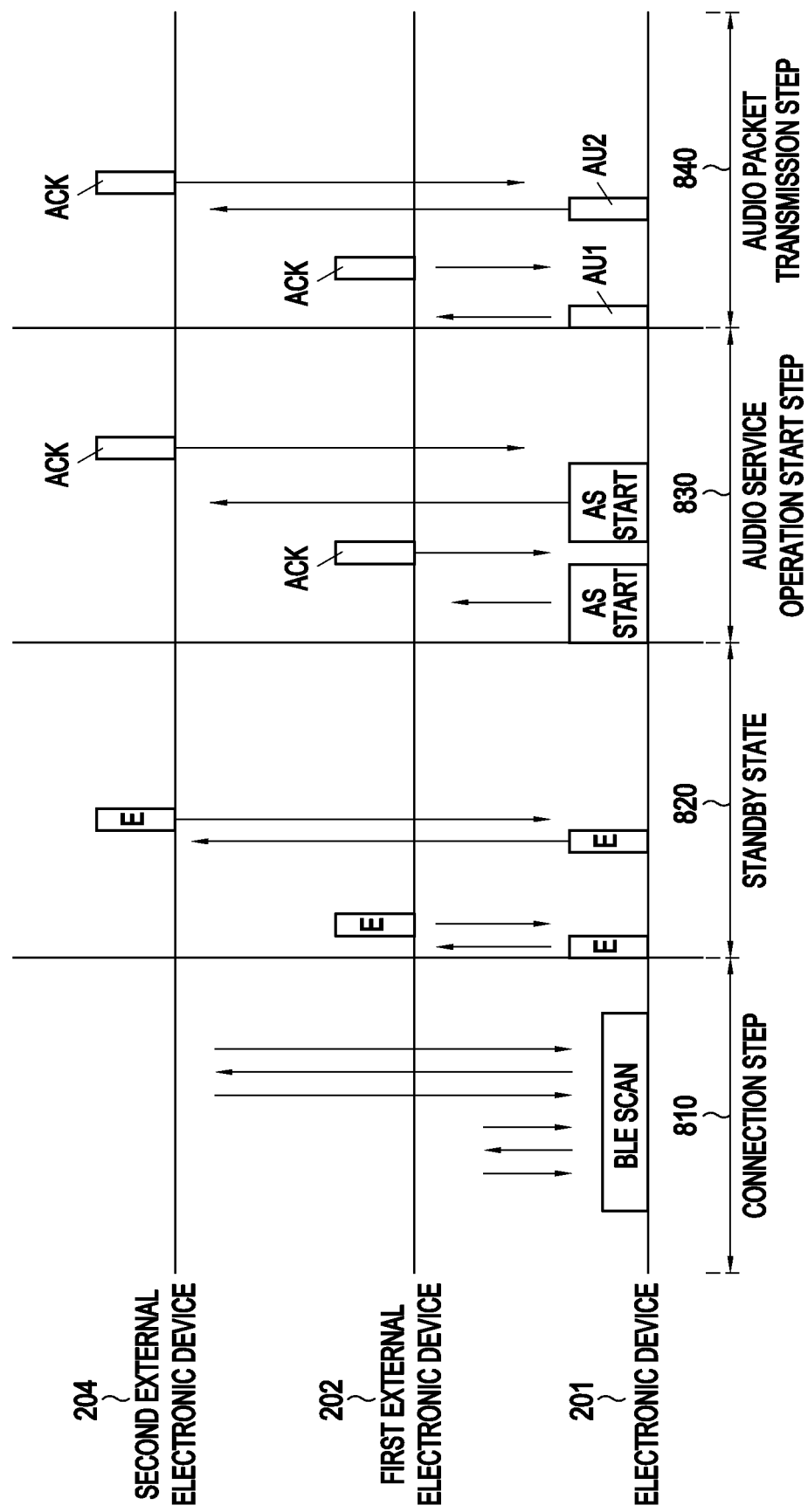
FIG. 8 is a view illustrating a method for transmitting an audio packet to a plurality of external electronic devices by an electronic device according to one or more embodiments.

FIG. 8 is a view illustrating a method for transmitting an audio packet to a plurality of external electronic devices by an electronic device according to one or more embodiments.

Referring to FIG. 8, according to one or more embodiments, in operation 810, the electronic device 201 may perform the operation of connecting with each of external electronic devices (e.g., the external electronic devices 202 and 204 of FIG. 2A). For example, the electronic device 201 may establish a communication link with each of the external electronic devices 202 and 204 using BLE communication technology. For example, the electronic device 201 may perform a BLE scan operation, receive an advertisement signal from the first external electronic device 202, and establish a first communication link with the first external electronic device 202 based on the received advertisement signal. Further, the electronic device 201 may perform a BLE scan operation, receive an advertisement signal from the second external electronic device 204, and establish a second communication link with the second external electronic device 204 based on the received advertisement signal. The electronic device 201 may identify an audio channel role of each of the external electronic devices 202 and 204 while establishing a communication link with each of the external electronic devices 202 and 204. For example, the electronic device 201 may identify that the first external electronic device 202 is a device corresponding to an audio channel in the first direction, based on a signal (e.g., an advertisement signal) received from the first external electronic device 202. Further, the electronic device 201 may identify that the second external electronic device 204 is a device corresponding to an audio channel in the second direction, based on a signal (e.g., an advertisement signal) received from the second external electronic device 204. According to an embodiment, after establishing a communication link with each of the external electronic devices 202 and 204, the electronic device 201 may identify an audio channel role of each of the external electronic devices 202 and 204. According to an embodiment, before establishing communication links (e.g., the first link and the second link of FIG. 2A) with the electronic device 201, the first external electronic device 202 and the second external electronic device 204 may establish a communication link (e.g., the third link of FIG. 2A) between the two devices. For example, before the first external electronic device 202 and the second external electronic device 204 establish a communication link with the electronic device 201, the roles of their respective audio channels may be determined. According to an embodiment, the electronic device 201 may identify whether each of the first external electronic device 202 and the second external electronic device 204 is capable of performing a link replacement function.

According to one or more embodiments, in operation 820, the electronic device 201 may perform an operation in a standby state while maintaining the communication link with each of the external electronic devices 202 and 204. For example, the standby state may refer to a state in which the electronic device 201 establishes a communication link (e.g., a BLE link) with each of the external electronic devices 202 and 204 and operates while maintaining an independent connection with each of the external electronic devices 202 and 204.

According to one or more embodiments, in operation 830, the electronic device 201 may perform the operation of starting a stereo audio output operation. The step of starting of the stereo audio output operation may refer to a section for starting a synchronized AoBLE service on the communication link of each of the external electronic devices 202 and 204. Thereafter, when the AoBLE service is opened, the electronic device 201 may transmit a packet (AS service start packet) indicating that stereo audio output starts to each of the external electronic devices 202 and 204. For example, the packet indicating that the stereo audio output starts may include parameters for an output delay value, a packet type, and an interval of each of the external electronic devices 202 and 204 capable of synchronizing. The electronic device 201 may generate first audio data (or a first audio packet) and second audio data (or a second audio packet) for stereo audio data, based on the audio channel role of each of the external electronic devices 202 and 204. The first audio data may be mono audio data corresponding to the audio channel in the first direction, and the second audio data may be mono audio data corresponding to the audio channel in the second direction.

According to one or more embodiments, in operation 840, the electronic device 201 may perform the operation of transmitting an audio packet to each of the external electronic devices 202 and 204. For example, for each designated time interval, the electronic device 201 may transmit the first audio packet AU1 including the first audio data to the first external electronic device 202 using the first communication link, and may transmit the second audio packet AU2 including the second audio data to the second external electronic device 204 using the second communication link.

Figure 9:
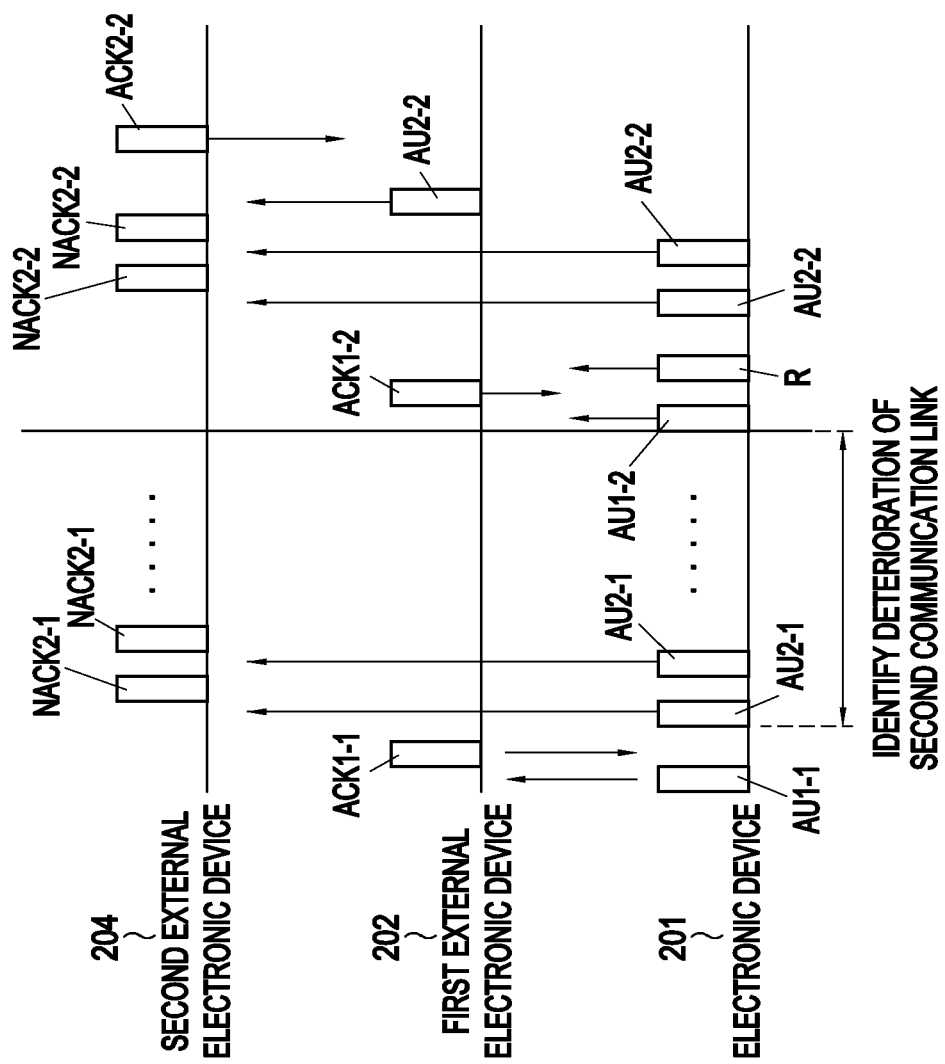
FIGS. 9, 10, and 11 are views illustrating a method for requesting a link replacement function from a first external electronic device by an electronic device according to one or more embodiments.
Figure 10:
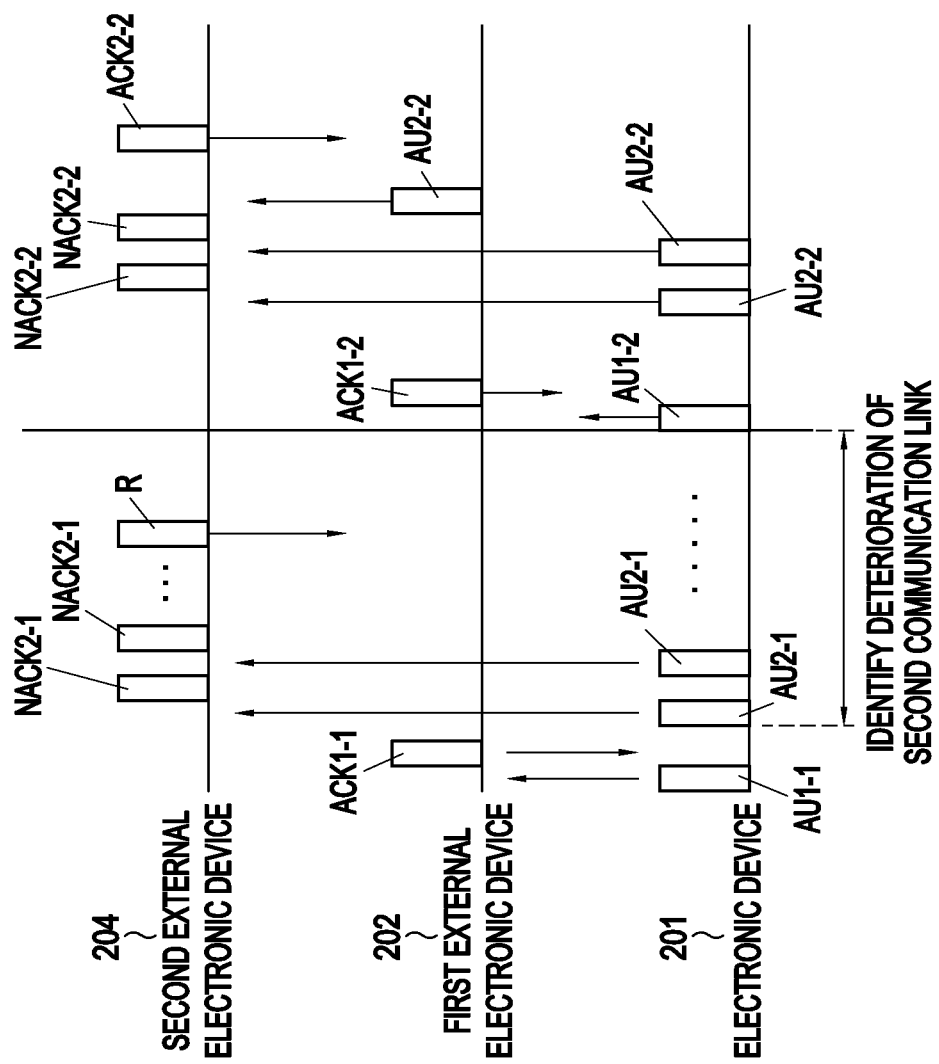
Figure 11:
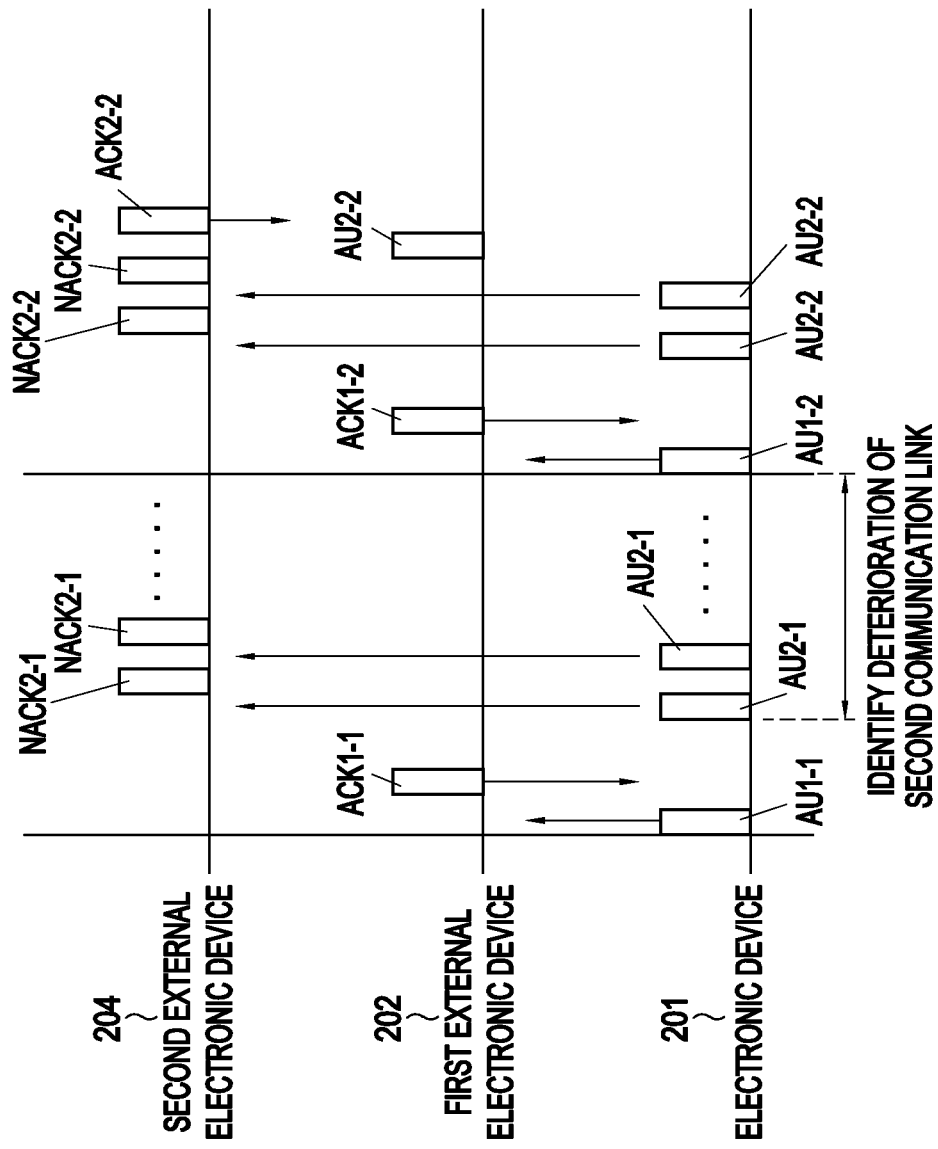

FIGS. 9 to 11 are views illustrating a method for requesting a link replacement function from a first external electronic device by an electronic device according to one or more embodiments.

Referring to FIG. 9, the electronic device 201 may transmit the first audio packet AU1-1 of the first time interval to the first external electronic device 202 using the first communication link. The electronic device 201 may receive a response signal ACK1-1 corresponding to a first audio packet AU1-1 of a first time interval. The electronic device 201 may transmit a second audio packet AU2-1 of the first time interval to the second external electronic device 204 using the second communication link. For example, the electronic device 201 may not receive the response signal ACK2-1 corresponding to the second audio packet AU2-1 of the first time interval due to the deterioration of the second communication link.

According to one or more embodiments, the electronic device 201 may identify that the second communication link is deteriorated, based on failure to receive the response signal ACK2-1 corresponding to the second audio packet AU2-1 of the first time interval. For example, the electronic device 201 may retransmit a designated number of second audio packets AU2-1 of the first time interval and may identify that the second communication link is deteriorated based on failure to receive the response signal ACK2-1 corresponding thereto. As another example, the electronic device 201 may identify that the second communication link is deteriorated, based on retransmission of the second audio packet AU2-1 of the first time interval and failure to receive the response signal ACK2-1 corresponding thereto for a designated time.

According to one or more embodiments, the electronic device 201 may transmit the first audio packet AU1-2 of the second time interval to the first external electronic device 202 using the first communication link. The electronic device 201 may receive a response signal ACK1-2 corresponding to the first audio packet AU1-2 of the second time interval.

According to one or more embodiments, the electronic device 201 may transmit a first message R for requesting to perform the link replacement function to the first external electronic device 202 using the first communication link. For example, the electronic device 201 may transmit the first message R to the first electronic device 202 after transmitting the first audio packet AU1-2 of the second time interval. Alternatively, the electronic device 201 may transmit the first message R together with the first audio packet AU1-2 of the second time interval or may transmit the first message R before the first audio packet AU1-2 of the second time interval.

According to one or more embodiments, the electronic device 201 may transmit the second audio packet AU2-2 of the second time interval to the second external electronic device 204 using the second communication link. However, the second external electronic device 204 may not receive the second audio packet AU2-2 of the second time interval from the electronic device 201 due to the deterioration of the second communication link. For example, the electronic device 201 may retransmit a designated number of second audio packets AU2-2 of the second time interval.

According to an embodiment, the first external electronic device 202 may access the second communication link and obtain the second audio packet AU2-2 of the second time interval in response to receiving the first message R. The first external electronic device 202 may transmit the second audio packet AU2-2 of the second time interval to the second external electronic device 204 using the third communication link. The second external electronic device 204 may receive the second audio packet AU2-2 of the second time interval from the first external electronic device 202. The second external electronic device 204 may transmit a response signal ACK2-2 to the second audio packet AU2-2 of the second time interval to the first external electronic device 202.

Referring to FIG. 10, according to one or more embodiments, the second external electronic device 204 may identify communication deterioration of the second communication link and transmit the first message R for requesting to perform the link replacement function to the first external electronic device 202.

According to one or more embodiments, as compared to FIG. 9, instead of the electronic device 201, the second external electronic device 204 may transmit the first message R for requesting to perform the link replacement function to the first external electronic device 202 using the third communication link. The first external electronic device 202 may perform the link replacement function in response to the first message R received from the second external electronic device 204.

Referring to FIG. 11, according to one or more embodiments, even when the first message R for requesting to perform the link replacement function is not received, the first external electronic device 202 may perform the link replacement function when a designated condition is satisfied. For example, when a predesignated application (e.g., a game application) is executed on the electronic device 201, the first external electronic device 202 and/or the second external electronic device 204 may perform the link replacement function even when the first message R for requesting to perform the link replacement function is not received. According to another embodiment, if the time interval for transmitting (or forwarding) the audio packet between the first external electronic device 202 and the second external electronic device 204 is short (e.g., shorter than a reference time), the link replacement function may be performed even when the first message R for requesting to perform the link replacement function is not received. For example, if it is determined that the time consumed due to the operation of requesting (or negotiating) the execution of the link replacement function is longer than the time taken to transmit (or forward) the audio packet, the first external electronic device 202 and/or the second external electronic device 204 may perform the link replacement function even when the first message R for requesting the execution of the link replacement function is not received. According to another embodiment, the first external electronic device 202 may monitor the second communication link of the second external electronic device 204, and may perform the link replacement function if communication deterioration of the second communication link is identified.

Figure 12:
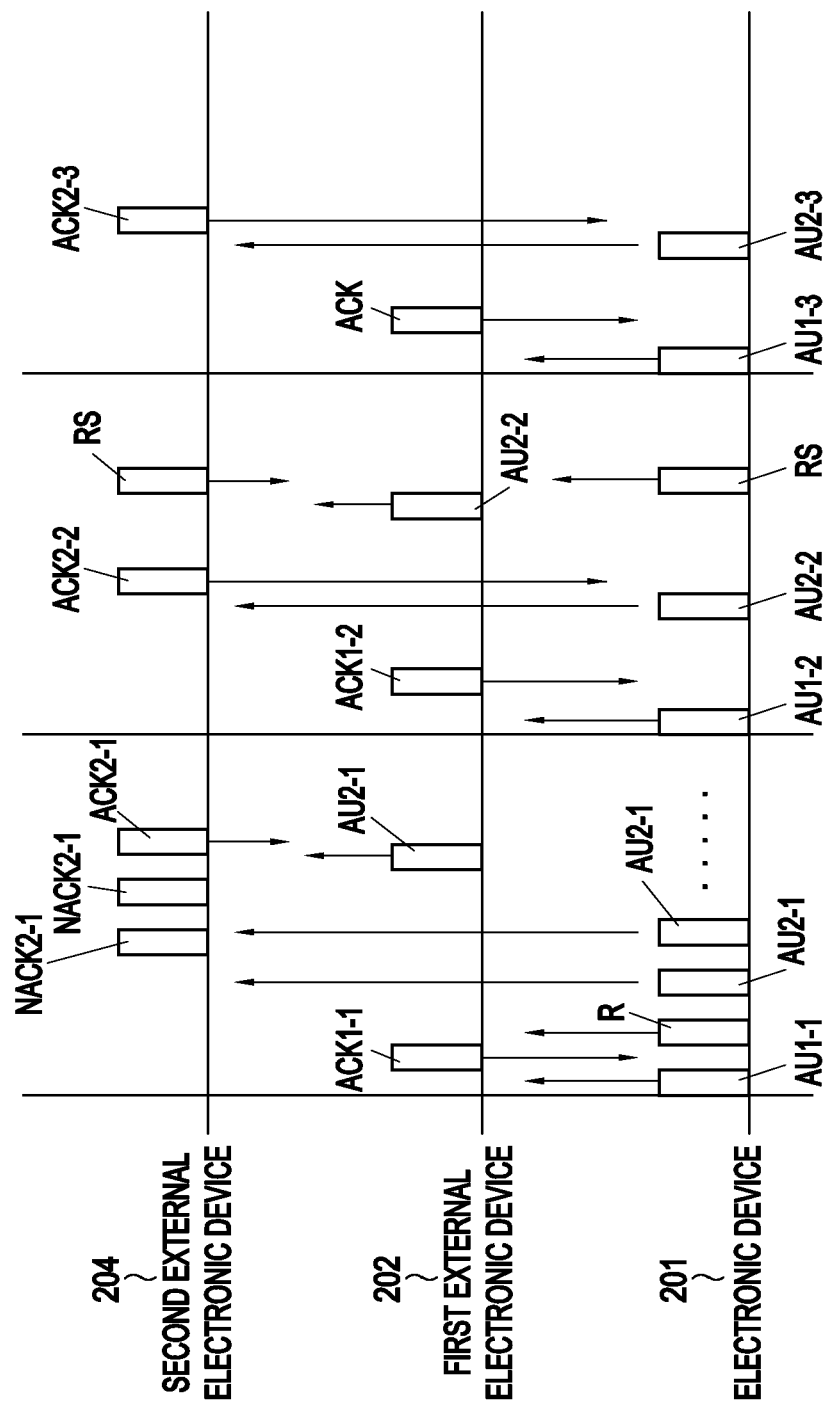
FIG. 12 is a view illustrating a method for transmitting an audio packet to a plurality of external electronic devices by an electronic device according to one or more embodiments.

FIG. 12 is a view illustrating a method for transmitting an audio packet to a plurality of external electronic devices by an electronic device according to one or more embodiments.

Referring to FIG. 12, the electronic device 201 may transmit the audio packet AU1-1 of the first time interval to the first external electronic device 202 using the first communication link, based on the deterioration of the second communication link. Further, the electronic device 201 may transmit the second audio packet AU2-1 of the first time interval to the second external electronic device 204 using the second communication link. However, the second external electronic device 204 may not normally receive the second audio packet AU2-1 of the first time interval from the electronic device 201 due to the deterioration of the second communication link.

According to one or more embodiments, the first external electronic device 202 may access the second communication link by performing a link replacement function, and may obtain the second audio packet AU2-1 of the first time interval through the second communication link. The first external electronic device 202 may transmit the second audio packet AU2-1 of the first time interval to the second external electronic device 204 using the third communication link. For example, the first external electronic device 202 may perform a link replacement function by at least one of the methods described with reference to FIGS. 9 to 11.

According to one or more embodiments, the electronic device 201 may transmit the first audio packet AU1-2 of the second time interval to the first external electronic device 202 using the first communication link. Further, the electronic device 201 may transmit the second audio packet AU2-2 of the second time interval to the second external electronic device 204 using the second communication link. The electronic device 201 may receive the response signal ACK2-2 corresponding to the second audio packet AU2-2 of the second time interval from the second external electronic device 204. For example, the electronic device 201 may determine that the second communication link is in a normal state based on the reception of the response signal ACK2-2.

According to one or more embodiments, the first external electronic device 202 may access the second communication link by performing the link replacement function, and may obtain the second audio packet AU2-2 of the second time interval through the second communication link. The first external electronic device 202 may transmit the second audio packet AU2-2 of the second time interval to the second external electronic device 204 using the third communication link. However, since the second external electronic device 204 has already received the second audio packet AU2-2 of the second time interval from the electronic device 201, the second external electronic device 204 may discard or disregard the second audio packet AU2-2 of the second time interval from the first external electronic device 202.

According to an embodiment, upon receiving the response signal ACK2-2 to the second audio packet AU2-2 of the second time interval from the second external electronic device 204, the electronic device 201 may transmit the second message RS indicating the request for terminating the link replacement function to the first external electronic device 201. Alternatively, based on receiving the second audio packet AU2-2 of the second time interval from the electronic device 201, the second external electronic device 204 may transmit the second message RS indicating the request for terminating the link replacement function to the first external electronic device 201. The first external electronic device 201 may terminate (or stop) the execution of the link replacement function based on the reception of the second message RS.

According to one or more embodiments, the electronic device 201 may transmit the first audio packet AU1-3 of the third time interval to the first external electronic device 202 using the first communication link. The electronic device 201 may transmit the second audio packet AU2-3 of the third time interval to the second external electronic device 204 using the second communication link. In other words, since the deterioration of the second communication link is resolved, the electronic device 201 may transmit the second audio packet to the second external electronic device 204 using the second communication link even when the first external electronic device 202 does not perform the link replacement function.

According to one or more embodiments, an electronic device (e.g., the electronic device 201) may comprise a communication module (e.g., the communication module 240) supporting Bluetooth communication and a processor (e.g., the processor 220) operatively connected to the communication module. The processor 220 may be configured to establish, through the communication module, a first communication link with a first external electronic device (e.g., the first external electronic device 202) and a second communication link with a second external electronic device (e.g., the second external electronic device 204), obtain a first audio packet including first audio data and a second audio packet including second audio data based on a command to output an audio, transmit the first audio packet to the first external electronic device using the first communication link and transmit the second audio packet to the second external electronic device using the second communication link, and based on identifying that a communication state of the second communication link is deteriorated, request the first external electronic device to perform a link replacement function such that the first external electronic device receives the second audio packet by accessing the second communication link and transmit the second audio packet to the second external electronic device.

The processor may be configured to identify whether the first external electronic device and the second external electronic device can perform the link replacement function.

The processor may be configured to, based on identifying that the first external electronic device can perform the link replacement function, transmit information about the second communication link for accessing the second communication link to the first external electronic device.

The processor may be configured to generate the first audio data and the second audio data based on roles of the first external electronic device and the second external electronic device.

The first audio data may include first mono audio data corresponding to a first direction in stereo audio data, and the second audio data may include second mono audio data corresponding to a second direction in the stereo audio data.

The processor may be configured to, based on receiving a response packet to the second audio packet from the second external electronic device, identify that the second communication link is in a normal state.

The processor may be configured to, based on identifying that the second communication link is in the normal state, request the first external electronic device to terminate the link replacement function.

The processor may be configured to, based on failing to receive at least one response signal to a designated number of second audio packets after transmitting the second audio packets through the second communication link, request the first external electronic device to perform the link replacement function.

The processor may be configured to, based on failing to receive a response signal corresponding to the second audio packet during a designated time, request the first external electronic device to perform the link replacement function.

The processor may be configured to transmit the first audio packet of a first time interval to the first external electronic device using the first communication link and transmit the second audio packet of a second time interval to the second external electronic device using the second communication link and, upon failing to receive a response signal to the second audio packet of the first time interval from the second external electronic device through the second communication link, transmit a message for requesting to perform the link replacement function to the first external electronic device such that the first external electronic device receives the second audio packet of the second time interval after the first time interval by accessing the second communication link and forwards the second audio packet of the second time interval to the second external electronic device.

The processor may be configured to transmit the first audio packet of the second time interval to the first external electronic device using the first communication link and, after requesting to perform the link replacement function, transmit the second audio packet of the second time interval to the second external electronic device using the second communication link.

The processor may be configured to, based on receiving a response signal to the second audio packet of the second time interval from the second external electronic device through the second communication link, transmit a message to terminate the link replacement function to the first external electronic device.

The processor may be configured to request to perform the link replacement function based on whether the first external electronic device or the second external electronic device is attached or detached.

Each of the first communication link and the second communication link may include a Bluetooth low energy (BLE) communication link.

The first external electronic device may include an earphone in a first direction, and the second external electronic device may include an earphone in a second direction.

According to one or more embodiments, a method for operating an electronic device (e.g., the electronic device 201) including a communication module (e.g., the communication module 240) supporting Bluetooth communication may comprise forming, through the communication module, a first communication link with a first external electronic device (e.g., the first external electronic device 202) and a second communication link with a second external electronic device (e.g., the second external electronic device 204), obtaining a first audio packet including first audio data and a second audio packet including second audio data based on a command to output an audio, transmitting the first audio packet to the first external electronic device using the first communication link and transmitting the second audio packet to the second external electronic device using the second communication link, and based on identifying that a communication state of the second communication link is deteriorated, requesting the first external electronic device to perform a link replacement function such that the first external electronic device receives the second audio packet by accessing the second communication link and transmits the second audio packet to the second external electronic device.

The method for operating the electronic device may further comprise identifying whether the first external electronic device and the second external electronic device can perform the link replacement function.

The method for operating the electronic device may further comprise, based on identifying that the first external electronic device can perform the link replacement function, transmitting information about the second communication link for accessing the second communication link to the first external electronic device.

The method for operating the electronic device may further comprise, based on identifying that the second communication link is in the normal state, requesting the first external electronic device to terminate the link replacement function.

The first audio data may include first mono audio data corresponding to a first direction in stereo audio data, and the second audio data may include second mono audio data corresponding to a second direction in the stereo audio data.

According to one or more embodiments, a first electronic device (e.g., the first external electronic device 202) may comprise a speaker (e.g., the first speaker 274), a communication module (e.g., the first communication module 272) supporting Bluetooth communication, and a processor (e.g., the first processor 270) operatively connected to the communication module. The processor may be configured to establish a first communication link with an electronic device (e.g., the electronic device 201), establish a third communication link with a second electronic device (e.g., the second external electronic device 204), receive a first audio packet including first audio data from the electronic device using the first communication link, perform a first operation for outputting the first audio data through the speaker, when it is requested to perform a link replacement function to access the second communication link between the electronic device and the second electronic device, access the second communication link to receive a second audio packet including second audio data from the electronic device, and transmit the second audio packet to the second electronic device using the third communication link.

The processor may be configured to obtain information about the second communication link for accessing the second communication link by using the first communication link from the electronic device or the third communication link from the second electronic device and access the second communication link by using the information about the second communication link.

The first electronic device may be implemented as an earphone in a first direction, and the second electronic device may be implemented as an earphone in a second direction.

Each of the aforementioned components of the electronic device may include one or more parts, and a name of the part may vary with a type of the electronic device. The electronic device in accordance with one or more embodiments of the disclosure may include at least one of the aforementioned components, omit some of them, or include other additional component(s). Some of the components may be combined into an entity, but the entity may perform the same functions as the components may do.

The embodiments disclosed herein are proposed for description and understanding of the disclosed technology and does not limit the scope of the disclosure. Accordingly, the scope of the disclosure should be interpreted as including all changes or one or more embodiments based on the technical spirit of the disclosure.

What is claimed is:

1. An electronic device comprising:
   a communication module; and
   a processor operatively connected to the communication module,
   wherein the processor is configured to:
      establish, through the communication module, a first communication link with a first external electronic device and, through the communication module, a second communication link with a second external electronic device;
      based on a command to output an audio, obtain a first audio packet comprising first audio data and obtain a second audio packet comprising second audio data;
      transmit the first audio packet to the first external electronic device by using the first communication link and transmit the second audio packet to the second external electronic device by using the second communication link; and
      based on a communication state of the second communication link, request the first external electronic device to:
         receive the second audio packet by accessing the second communication link, and
         transmit the second audio packet to the second external electronic device.

2. The electronic device of claim 1, wherein the processor is further configured to identify that the first external electronic device is configured to receive the second audio packet by accessing the second communication link.

3. The electronic device of claim 2, wherein the processor is further configured to transmit, to the first external electronic device, information about the second communication link for accessing the second communication link.

4. The electronic device of claim 1, wherein the processor is further configured to generate the first audio data and the second audio data based on roles of the first external electronic device and the second external electronic device,
   wherein the first audio data comprises first mono audio data corresponding to a first direction in stereo audio data, and
   wherein the second audio data comprises second mono audio data corresponding to a second direction in the stereo audio data.

5. The electronic device of claim 1, wherein the processor is further configured to:
   based on receiving a response packet to the second audio packet from the second external electronic device, identify that the second communication link is in a normal state; and
   based on identifying that the second communication link is in the normal state, request the first external electronic device not to receive the second audio packet by accessing the second communication link.

6. The electronic device of claim 1, wherein the processor is further configured to, based on failing to receive at least one response signal to a designated number of second audio packets after transmitting the second audio packets through the second communication link, request the first external electronic device to receive the second audio packet by accessing the second communication link and to transmit the second audio packet to the second external electronic device.

7. The electronic device of claim 1, wherein the processor is further configured to, based on failing to receive a response signal corresponding to the second audio packet during a designated time, request the first external electronic device to receive the second audio packet by accessing the second communication link and to transmit the second audio packet to the second external electronic device.

8. The electronic device of claim 1, wherein the processor is further configured to:
- transmit the first audio packet of a first time interval to the first external electronic device by using the first communication link,
- transmit the second audio packet of a second time interval to the second external electronic device by using the second communication link,
- based on not receiving a response signal to the second audio packet of the first time interval from the second external electronic device through the second communication link, transmit, to the first external electronic device, a message for requesting to receive the second audio packet of the second time interval after the first time interval by accessing the second communication link, and to forward the second audio packet of the second time interval to the second external electronic device,
- transmit the first audio packet of the second time interval to the first external electronic device by using the first communication link, and
- after requesting to receive the second audio packet by accessing the second communication link, transmit the second audio packet of the second time interval to the second external electronic device by using the second communication link.

9. A method performed by an electronic device comprising a communication module, the method comprising:
- establishing, through the communication module, a first communication link with a first external electronic device and, through the communication module, a second communication link with a second external electronic device;
- based on a command to output an audio, obtaining a first audio packet comprising first audio data and obtaining a second audio packet comprising second audio data;
- transmitting the first audio packet to the first external electronic device by using the first communication link and transmitting the second audio packet to the second external electronic device by using the second communication link; and
- based on a communication state of the second communication link, requesting the first external electronic device to:
  - receive the second audio packet by accessing the second communication link and
  - transmit the second audio packet to the second external electronic device.

10. The method of claim 9, further comprising identifying that the first external electronic device is configured to receive the second audio packet by accessing the second communication link and to transmit the second audio packet to the second external electronic device.

11. The method of claim 10, further comprising transmitting, to the first external electronic device, information about the second communication link for accessing the second communication link.

12. The method of claim 9, further comprising, based on identifying that the second communication link is in a normal state, requesting the first external electronic device to not receive the second audio packet by accessing the second communication link.

13. The method of claim 9, wherein the first audio data comprises first mono audio data corresponding to a first direction in stereo audio data, and
- wherein the second audio data comprises second mono audio data corresponding to a second direction in the stereo audio data.

14. The method of claim 9, further comprising generating the first audio data and the second audio data based on roles of the first external electronic device and the second external electronic device,
- wherein the first audio data comprises first mono audio data corresponding to a first direction in stereo audio data, and
- wherein the second audio data comprises second mono audio data corresponding to a second direction in the stereo audio data.

15. The method of claim 9, further comprising:
- based on receiving a response packet to the second audio packet from the second external electronic device, identifying that the second communication link is in a normal state; and
- based on identifying that the second communication link is in the normal state, requesting the first external electronic device not to receive the second audio packet by accessing the second communication link.

* * * * *